(12) United States Patent
Thorsander et al.

(10) Patent No.: US 9,223,483 B2
(45) Date of Patent: Dec. 29, 2015

(54) METHOD AND APPARATUS FOR PROVIDING A USER INTERFACE ON A DEVICE THAT INDICATES CONTENT OPERATORS

(75) Inventors: Simon Martin Thorsander, Eslöv (SE); Per Åke Daniel Johansson, Malmö (SE); Nils Roger Andersson Reimer, Malmö (SE); Robert Simon Lessing, Malmö (SE); Jonas Ove Arbsjö, Malmö (SE); Charles Anton Nilsson Boman, Malmö (SE); Ahmed ElSaeed Mohamed Gad Eldessouki, Waterloo (CA); Andreas Pal Drén, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/550,373

(22) Filed: Jul. 16, 2012

(65) Prior Publication Data

US 2013/0227483 A1 Aug. 29, 2013

Related U.S. Application Data

(60) Provisional application No. 61/602,912, filed on Feb. 24, 2012.

(51) Int. Cl.
*G06F 3/0484* (2013.01)
*G06F 3/0488* (2013.01)

(52) U.S. Cl.
CPC .......... *G06F 3/04842* (2013.01); *G06F 3/0488* (2013.01)

(58) Field of Classification Search
CPC ........................... G06F 3/04842; G06F 3/0488
USPC ........................................ 715/825, 835, 864
See application file for complete search history.

(56) References Cited

U.S. PATENT DOCUMENTS

| | | |
|---|---|---|
| 5,287,448 A | 2/1994 | Nicol et al. |
| 5,305,435 A | 4/1994 | Bronson |

(Continued)

FOREIGN PATENT DOCUMENTS

| | | |
|---|---|---|
| EP | 2040154 | 3/2009 |
| EP | 2079012 A2 | 7/2009 |

(Continued)

OTHER PUBLICATIONS

Xobni User Manual, Sep. 28, 2010, version 1.9.5.*

(Continued)

*Primary Examiner* — Aaron Lowenberger
(74) *Attorney, Agent, or Firm* — Fish & Richardson P.C.

(57) ABSTRACT

A computer-implemented method of operating an electronic device having a display and means for receiving user input, the method comprises: displaying on the display a menu adjacent an edge of the display, the menu containing one or more icons, each icon representing a function and being selectable by the user; and in response to detection of a user input in relation to an icon, causing the device to display a description of the function of the icon, wherein the description is displayed to project from the menu.

25 Claims, 13 Drawing Sheets

(56) References Cited

U.S. PATENT DOCUMENTS

| | | |
|---|---|---|
| 5,565,888 A | 10/1996 | Selker |
| 5,646,362 A | 7/1997 | Koyama et al. |
| 5,659,747 A | 8/1997 | Nakajima |
| 5,664,133 A | 9/1997 | Malamud et al. |
| 5,748,927 A | 5/1998 | Stein et al. |
| 5,760,773 A | 6/1998 | Berman et al. |
| 5,825,348 A | 10/1998 | Ludolph et al. |
| 5,874,958 A | 2/1999 | Ludolph |
| 5,890,172 A | 3/1999 | Borman et al. |
| 5,943,053 A | 8/1999 | Ludolph et al. |
| 5,986,657 A | 11/1999 | Berteig et al. |
| 6,054,990 A | 4/2000 | Tran |
| 6,072,486 A | 6/2000 | Sheldon et al. |
| 6,157,379 A | 12/2000 | Singh |
| 6,209,006 B1 | 3/2001 | Medl et al. |
| 6,297,819 B1 | 10/2001 | Furst |
| 6,552,737 B1 | 4/2003 | Tanaka et al. |
| 6,583,798 B1 | 6/2003 | Hoek et al. |
| 6,624,831 B1 | 9/2003 | Shahine et al. |
| 6,639,612 B2 | 10/2003 | Bosma et al. |
| 6,781,610 B2 | 8/2004 | Os et al. |
| 6,833,851 B1 | 12/2004 | Brunk |
| 6,978,422 B1 | 12/2005 | Bushe et al. |
| 7,047,499 B2 | 5/2006 | Ferri |
| 7,213,214 B2 | 5/2007 | Baar et al. |
| 7,249,320 B2 | 7/2007 | Simmons et al. |
| 7,263,668 B1 | 8/2007 | Lentz |
| 7,287,233 B2 | 10/2007 | Arend et al. |
| 7,310,782 B2 | 12/2007 | Buchanan et al. |
| D562,343 S | 2/2008 | Fletcher |
| 7,343,567 B2 | 3/2008 | Mann et al. |
| 7,373,592 B2 | 5/2008 | Allyn |
| 7,386,801 B1 | 6/2008 | Horvitz et al. |
| 7,406,666 B2 | 7/2008 | Davis et al. |
| 7,432,928 B2 | 10/2008 | Shaw et al. |
| 7,512,898 B2 | 3/2009 | Jennings et al. |
| 7,526,738 B2 | 4/2009 | Ording et al. |
| 7,530,030 B2 | 5/2009 | Baudisch |
| 7,536,653 B2 | 5/2009 | Badovinac et al. |
| 7,716,679 B1 | 5/2010 | Friedman et al. |
| 7,779,365 B2 | 8/2010 | Fujita |
| 7,797,645 B2 | 9/2010 | Stevens et al. |
| 7,818,684 B1 | 10/2010 | Smith |
| 7,877,685 B2 | 1/2011 | Peters |
| 7,913,183 B2 | 3/2011 | Czerwinski et al. |
| 7,962,522 B2 | 6/2011 | Norris, III |
| 8,019,389 B2 | 9/2011 | Kim et al. |
| 8,031,845 B2 | 10/2011 | Gruen et al. |
| 8,032,843 B2 | 10/2011 | Ording et al. |
| 8,095,888 B2 | 1/2012 | Jang et al. |
| 8,103,600 B1 | 1/2012 | Rubin |
| 8,196,066 B1 | 6/2012 | Ouyang et al. |
| 8,255,824 B2 | 8/2012 | Selig |
| 8,453,067 B1 | 5/2013 | Holler et al. |
| 8,527,881 B2 | 9/2013 | Selig |
| 8,539,375 B1 | 9/2013 | Thorsander et al. |
| 2002/0186253 A1 | 12/2002 | Rodden et al. |
| 2002/0186257 A1 | 12/2002 | Cadiz et al. |
| 2003/0011638 A1 | 1/2003 | Chung |
| 2003/0035012 A1 | 2/2003 | Kurtenbach et al. |
| 2003/0164859 A1 | 9/2003 | Evans |
| 2003/0222923 A1 | 12/2003 | Li |
| 2004/0021647 A1 | 2/2004 | Iwema et al. |
| 2004/0119745 A1 | 6/2004 | Bartek et al. |
| 2004/0150668 A1 | 8/2004 | Myers et al. |
| 2004/0160463 A1 | 8/2004 | Battles et al. |
| 2004/0210849 A1 | 10/2004 | Becker |
| 2004/0268265 A1 | 12/2004 | Berger |
| 2004/0268268 A1 | 12/2004 | Scheu et al. |
| 2005/0022136 A1 | 1/2005 | Hatscher et al. |
| 2005/0050462 A1 | 3/2005 | Whittle et al. |
| 2005/0060653 A1 | 3/2005 | Fukase et al. |
| 2005/0060664 A1 | 3/2005 | Rogers |
| 2005/0183030 A1 | 8/2005 | Bertram et al. |
| 2005/0268224 A1 | 12/2005 | Hanson et al. |
| 2005/0273729 A1 | 12/2005 | Kumashio |
| 2006/0026532 A1 | 2/2006 | Pagan |
| 2006/0031779 A1 | 2/2006 | Theurer et al. |
| 2006/0085767 A1 | 4/2006 | Hinckley et al. |
| 2006/0092181 A1 | 5/2006 | Park |
| 2006/0107229 A1 | 5/2006 | Matthews et al. |
| 2006/0242557 A1 | 10/2006 | Nortis, III |
| 2006/0245644 A1 | 11/2006 | Whitman |
| 2006/0282786 A1 | 12/2006 | Shaw et al. |
| 2007/0044086 A1 | 2/2007 | Sampath |
| 2007/0061756 A1 | 3/2007 | Parrish et al. |
| 2007/0129817 A1 | 6/2007 | Cadiz et al. |
| 2007/0133074 A1 | 6/2007 | Fabrice |
| 2007/0157106 A1 | 7/2007 | Bishop |
| 2007/0157119 A1 | 7/2007 | Bishop |
| 2007/0157125 A1 | 7/2007 | Peters |
| 2007/0213099 A1 | 9/2007 | Bast |
| 2007/0229471 A1 | 10/2007 | Kim et al. |
| 2007/0245260 A1 | 10/2007 | Koppert |
| 2007/0260997 A1 | 11/2007 | Braun et al. |
| 2008/0019591 A1 | 1/2008 | Iwayama et al. |
| 2008/0074399 A1 | 3/2008 | Lee |
| 2008/0094371 A1 | 4/2008 | Forstall et al. |
| 2008/0109717 A1 | 5/2008 | Krauter |
| 2008/0120569 A1 | 5/2008 | Mann et al. |
| 2008/0168349 A1 | 7/2008 | Lamiraux et al. |
| 2008/0172607 A1 | 7/2008 | Baer |
| 2008/0184159 A1 | 7/2008 | Selig |
| 2008/0250354 A1 | 10/2008 | Park |
| 2008/0270894 A1 | 10/2008 | Whittle et al. |
| 2008/0272907 A1 | 11/2008 | Bonansea et al. |
| 2008/0313569 A1 | 12/2008 | Aoki et al. |
| 2009/0006956 A1 | 1/2009 | Bae et al. |
| 2009/0007017 A1* | 1/2009 | Anzures et al. ............... 715/835 |
| 2009/0031232 A1 | 1/2009 | Brezina et al. |
| 2009/0172597 A1 | 7/2009 | Mercer |
| 2009/0174668 A1 | 7/2009 | Cho |
| 2009/0177754 A1 | 7/2009 | Brezina et al. |
| 2009/0228825 A1* | 9/2009 | Van Os et al. ................. 715/780 |
| 2009/0271702 A1* | 10/2009 | Bamford et al. .............. 715/702 |
| 2009/0276702 A1* | 11/2009 | Bamford et al. .............. 715/702 |
| 2009/0278806 A1 | 11/2009 | Duarte et al. |
| 2009/0282332 A1 | 11/2009 | Porat |
| 2009/0282352 A1 | 11/2009 | Solanki et al. |
| 2009/0313567 A1 | 12/2009 | Kwon et al. |
| 2010/0058216 A1 | 3/2010 | Yoon et al. |
| 2010/0073303 A1 | 3/2010 | Wu et al. |
| 2010/0088641 A1 | 4/2010 | Choi |
| 2010/0107102 A1 | 4/2010 | Wang et al. |
| 2010/0124946 A1 | 5/2010 | Chun |
| 2010/0162167 A1 | 6/2010 | Stallings et al. |
| 2010/0169364 A1 | 7/2010 | Hardt |
| 2010/0186002 A1 | 7/2010 | Friedman et al. |
| 2010/0199180 A1 | 8/2010 | Brichter |
| 2010/0211920 A1 | 8/2010 | Westerman et al. |
| 2010/0235770 A1 | 9/2010 | Ording et al. |
| 2010/0238126 A1 | 9/2010 | Chen et al. |
| 2010/0262928 A1 | 10/2010 | Abbott |
| 2011/0010672 A1 | 1/2011 | Hope |
| 2011/0019239 A1 | 1/2011 | Kojima et al. |
| 2011/0037714 A1 | 2/2011 | Seo et al. |
| 2011/0072345 A1 | 3/2011 | Lim |
| 2011/0074828 A1 | 3/2011 | Capela et al. |
| 2011/0078615 A1* | 3/2011 | Bier ............................. 715/779 |
| 2011/0087983 A1 | 4/2011 | Shim |
| 2011/0087994 A1 | 4/2011 | Swink et al. |
| 2011/0107246 A1 | 5/2011 | Vik |
| 2011/0115817 A1 | 5/2011 | Chun |
| 2011/0126094 A1 | 5/2011 | Horodezky et al. |
| 2011/0126097 A1 | 5/2011 | Isono |
| 2011/0161853 A1 | 6/2011 | Park |
| 2011/0202870 A1 | 8/2011 | Happonen |
| 2011/0202878 A1 | 8/2011 | Park et al. |
| 2011/0219332 A1 | 9/2011 | Park |
| 2011/0219334 A1 | 9/2011 | Park |
| 2011/0231796 A1 | 9/2011 | Vigil |
| 2011/0239155 A1 | 9/2011 | Christie |
| 2011/0239166 A1 | 9/2011 | Choi |
| 2011/0252375 A1 | 10/2011 | Chaudhri |

(56) References Cited

U.S. PATENT DOCUMENTS

| | | | |
|---|---|---|---|
| 2011/0264996 A1 | 10/2011 | Norris, III | |
| 2011/0265035 A1 | 10/2011 | Lepage et al. | |
| 2011/0271222 A1 | 11/2011 | Cho | |
| 2011/0296349 A1 | 12/2011 | Todd et al. | |
| 2011/0300910 A1 | 12/2011 | Choi | |
| 2012/0030566 A1 | 2/2012 | Victor | |
| 2012/0036471 A1* | 2/2012 | Swanson et al. | 715/779 |
| 2012/0079417 A1 | 3/2012 | Kalu et al. | |
| 2012/0099129 A1* | 4/2012 | Ogino et al. | 358/1.13 |
| 2012/0124515 A1 | 5/2012 | Li et al. | |
| 2012/0127206 A1 | 5/2012 | Thompson et al. | |
| 2012/0233545 A1 | 9/2012 | Ikeda et al. | |
| 2013/0007627 A1 | 1/2013 | Monaco | |
| 2013/0074014 A1 | 3/2013 | Ouyang et al. | |
| 2013/0227413 A1 | 8/2013 | Thorsander et al. | |
| 2013/0227454 A1 | 8/2013 | Thorsander et al. | |
| 2013/0227470 A1 | 8/2013 | Thorsander et al. | |
| 2013/0227482 A1 | 8/2013 | Thorsander et al. | |
| 2013/0227490 A1 | 8/2013 | Thorsander et al. | |
| 2013/0275917 A1 | 10/2013 | Norris, III | |
| 2014/0047390 A1 | 2/2014 | Thorsander et al. | |

FOREIGN PATENT DOCUMENTS

| | | |
|---|---|---|
| EP | 2169528 | 3/2010 |
| EP | 2237534 | 10/2010 |
| EP | 2284675 | 2/2011 |
| EP | 2284675 A2 | 2/2011 |
| EP | 2343643 | 7/2011 |
| EP | 2386940 A1 | 11/2011 |
| EP | 2393000 | 12/2011 |
| GB | 2476857 | 7/2011 |
| WO | 2008030975 | 3/2008 |
| WO | 2009120925 | 10/2009 |
| WO | 2010118079 | 10/2010 |
| WO | 2011107839 A1 | 9/2011 |

OTHER PUBLICATIONS

Harrison et al., Kineticons: USing Iconographic Motion in Graphical User interface Design, May 2011, CHI '11: Proceedings of the SIGCHI Conference on Human Factors in Computing Systems, ACM.*

Set the animation timing or effect options—PowerPoint—Microsoft Office, archived by the Wayback Machine on Jun. 22, 2010, retrieved from http://web.archive.org/web/20100622085159/http://office.microsoft.com/en-us/powerpoint-help/set-the-animation-timing-or-effect-options-HA101792360.aspx on Dec. 21, 2012.*

How to add custom values to animation effect options in PowerPoint, archived by the Wayback Machine on Oct. 21, 2010, retrieved from http://web.archive.org/web/20101021012406/http://support.microsoft.com/kb/293511 on Dec. 21, 2012.*

Ice Cream Sandwich, Welcome to Android 4.01 http://developer.android.com/about/versions/android-4.0-highlights.htm, retrieved Nov. 7, 2012, 11 pages.

Nokia Developer, Symbian C++ Information Centre, http://library.developer.nokia.com/, retrieved Nov. 7, 2012, 2 pages.

European Patent Office, Extended European Search Report issued in EP Application No. 12176602, dated Dec. 6, 2012, 5 pages.

International Searching Authority, International Search Report and Written Opinion issued in International Application No. PCT/EP2013/053639, mailed Apr. 18, 2013, 11 pages.

European Patent Office, Communication pursuant to Article 94(3) EPC issued in connection with European Patent No. 12176602.6, dated Aug. 12, 2014, 5 pages.

European Patent Office, "Communication Pursuant to Article 94(3) EPC," issued in connection with European Patent Application No. 12176603.4, dated Apr. 24, 2014, 6 pages.

International Searching Authority, "International Search Report," issued in connection with International Patent Application No. PCT/EP2013/053640, mailed on Jun. 5, 2013, 4 pages.

International Searching Authority, "Written Opinion of the International Searching Authority," issued in connection with International Patent Application No. PCT/EP2013/053640, mailed on Jun. 5, 2013, 6 pages.

European Patent Office, "Extended European Search Report", issued in connection with European Application No. 12176603.4, dated Apr. 24, 2013, 9 pages.

International Standard ISO 9241-10, "Ergonomic requirements for office work with visual display terminals (VDTs)—Part 10: Dialogue principles", May 1, 1996, 18 pages.

International Standard ISO 9241-13, "Ergonomic requirements for office work with visual display terminals (VDTs)—Part 13: User Guidance", Jul. 15, 1998, 38 pages.

International Standard ISO 9241-14, "Ergonomic requirements for office work with visual display terminals (VDTs)—Part 14: Menu Dialogues", Jun. 1, 1997, 64 pages.

United States Patent and Trademark Office, "Advisory Action", issued in connection with U.S. Appl. No. 13/550,379, mailed on Aug. 9, 2013, 5 pages.

United States Patent and Trademark Office, "Final Office Action", issued in connection with U.S. Appl. No. 13/550,379, mailed on Apr. 30, 2013, 15 pages.

United States Patent and Trademark Office, "Office Action", issued in connection with U.S. Appl. No. 13/550,379, mailed on Jan. 8, 2013, 21 pages.

International Searching Authority, "International Search Report and Written Opinion of the International Searching Authority," issued in connection with International Patent Application No. PCT/EP2013/053641, mailed on Apr. 12, 2013, 10 pages.

Xobni Corp., "Xobni User Manual", version 1.9.5, pp. 1-39, 2009, 39 pages.

European Patent Office, "Extended European Search Report", issued in connection with European Application No. 12176604.2, dated Oct. 31, 2012, 5 pages.

"Ice Cream Sandwich", http://developer.android.com/about/versions/android-4.0-highlights.html, accessed Nov. 7, 2012, 11 pages.

United States Patent and Trademark Office, "Final Office Action", issued in connection with U.S. Appl. No. 13/550,385, mailed on Jan. 8, 2015, 33 pages.

United States Patent and Trademark Office, "Final Office Action", issued in connection with U.S. Appl. No. 13/550,385, mailed on Jun. 24, 2013, 42 pages.

United States Patent and Trademark Office, "Office Action", issued in connection with U.S. Appl. No. 13/550,385, mailed on Dec. 24, 2013, 22 pages.

United States Patent and Trademark Office, "Office Action", issued in connection with U.S. Appl. No. 13/550,385, mailed on Jan. 25, 2013, 78 pages.

European Patent Office, "Extended European Search Report", issued in connection with European Application No. 12176605.9, dated Jan. 17, 2013, 8 pages.

Sue Chastain, How to Quickly Select Many Photos in iOS, About.com Computing Graphics Software, http://graphicssoft.about.com/od/iphoneandipodtouchapps/ht/Select-Many-Photos.htm, accessed Nov. 21, 2012, 1 page.

United States Patent and Trademark Office, "Final Office Action", issued in connection with U.S. Appl. No. 13/550,388, mailed on Jun. 3, 2013, 25 pages.

United States Patent and Trademark Office, "Final Office Action", issued in connection with U.S. Appl. No. 13/550,388, mailed on Jan. 4, 2013, 25 pages.

United States Patent and Trademark Office, "Office Action", issued in connection with U.S. Appl. No. 13/550,379, mailed on Feb. 6, 2015, 24 pages.

United States Patent and Trademark Office, "Final Office Action", issued in connection with U.S. Appl. No. 14/028,041, mailed on Jan. 29, 2015, 50 pages.

International Searching Authority, "International Search Report and Written Opinion of the International Searching Authority", issued in connection with PCT Application No. PCT/EP2013/053637, mailed Jun. 17, 2013, 14 pages.

(56) References Cited

OTHER PUBLICATIONS

European Patent Office, "Extended European Search Report", issued in connection with European Application No. 12176601, mailed on Dec. 10, 2012, 11 pages.

United States Patent and Trademark Office, "Office Action", issued in connection with U.S. Appl. No. 13/550,360, mailed on Jan. 4, 2013, 28 pages.

United States Patent and Trademark Office, "Notice of Allowance", issued in connection with U.S. Appl. No. 13/550,360, mailed on May 8, 2013, 29 pages.

European Patent Office, "Communication Pursuant to Article 94(3) EPC", issued in connection with European Application No. 12176601, mailed on Apr. 9, 2014, 4 pages.

United States Patent and Trademark Office, "Supplemental Notice of Allowability", issued in connection with U.S. Appl. No. 13/550,360, mailed on Jul. 18, 2013, 16 pages.

United States Patent and Trademark Office, "Office Action", issued in connection with U.S. Appl. No. 13/550,393, mailed on Sep. 11, 2014, 23 pages.

United States Patent and Trademark Office, "Final Office Action", issued in connection with U.S. Appl. No. 13/550,393, mailed on Jul. 15, 2013, 23 pages.

United States Patent and Trademark Office, "Office Action", issued in connection with U.S. Appl. No. 13/550,393, mailed on Jan. 4, 2013, 25 pages.

United States Patent and Trademark Office, "Advisory Action", issued in connection with U.S. Appl. No. 13/550,393, mailed on Sep. 25, 2013, 4 pages.

* cited by examiner

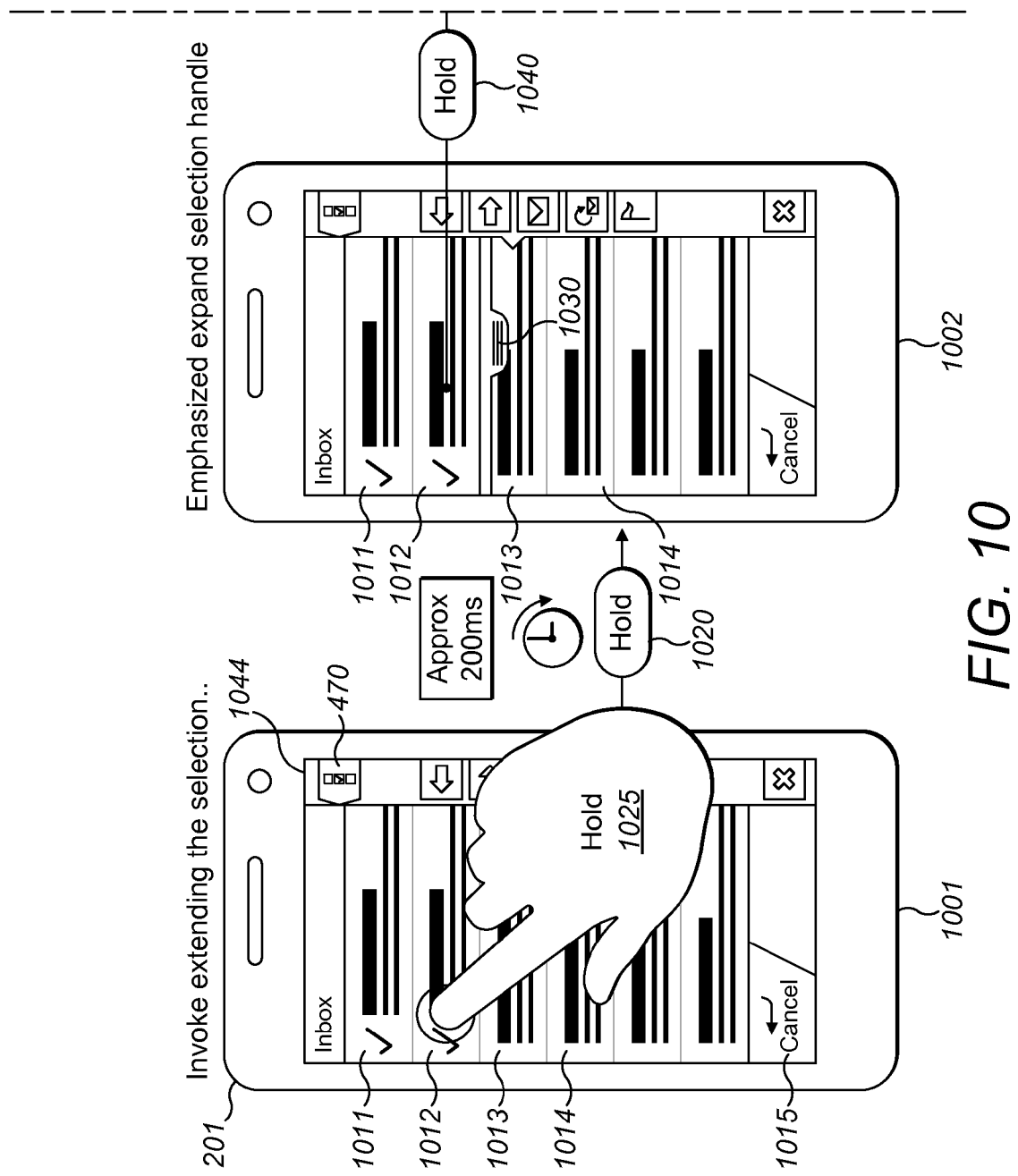

METHOD AND APPARATUS FOR PROVIDING A USER INTERFACE ON A DEVICE THAT INDICATES CONTENT OPERATORS

FIELD OF THE TECHNOLOGY

This present disclosure relates to electronic devices and, more particularly, to user interfaces used within those devices for accessing and performing quick actions on items of content on the electronic devices.

BACKGROUND

Electronic devices are in many cases provided with one or more displays for providing visual information to users of the devices. The electronic devices can be provided with user interfaces for display on the display of the device for facilitating user interaction with, and operation of, the device via one or more user inputs. The user interfaces comprise visual elements that can be arranged in various manners on the screen and can represent, for example, executable software programs, menu items indicating selectable functionality or operations available to the user within programs, a state of some aspect of program or data or other function of the device, etc. User inputs such as trackpads, trackballs, mice, cursors, touch screens and multitouch screens, can provide pointer-type controls usable to adjust the position of a pointer in multiple dimensions to allow interaction with the user interface by, for example, enabling navigation through menu systems, options, file systems, program shortcuts etc, and enabling selection and manipulation of visual elements and the items they represent.

There is a need for user interfaces that are simple enough to be intuitive to new users, while still allowing a user to perform complex actions quickly. Furthermore, with a finite amount of screen real estate available on displays for electronic devices, there is a need for user interfaces that can perform their function while minimising the amount of screen space used that could otherwise be utilised for displaying content.

BRIEF DESCRIPTION OF DRAWINGS

Examples of the present proposed approach will now be described in detail with reference to the accompanying drawings, in which.

DETAILED DESCRIPTION

Figure 1:
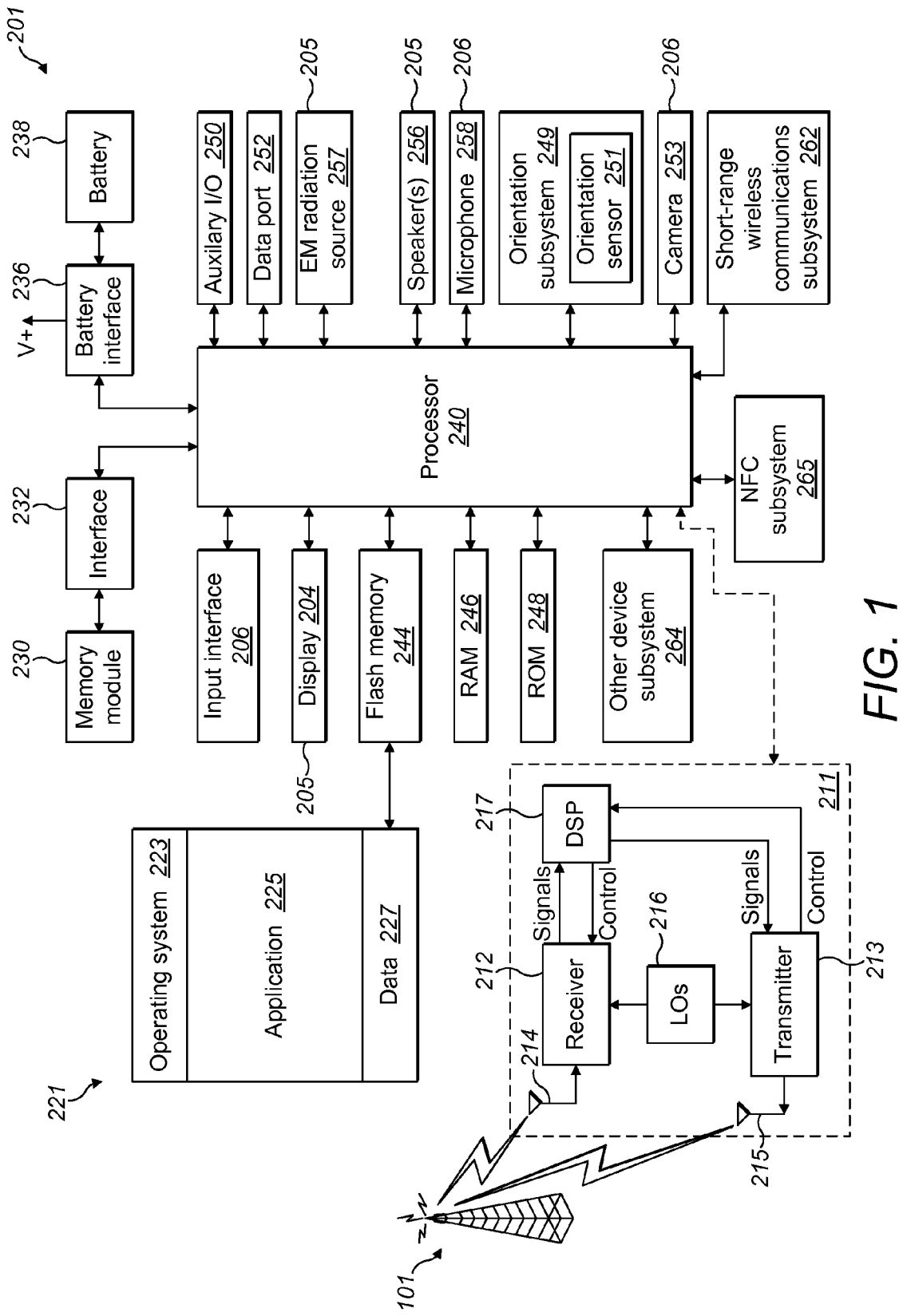
FIG. 1 is a block diagram illustrating an electronic device in accordance with example embodiments of the present disclosure.

In one embodiment, the present disclosure describes a computer-implemented method, at an electronic device having a display and means for receiving user input, said method comprising displaying on the display a menu adjacent an edge of the display, the menu containing one or more icons, each icon representing a function and being selectable by the user; and in response to detection of a user input in relation to an icon, causing the device to display a description of the function of the icon, wherein the description is displayed to project from the menu.

One advantage of displaying a description of the function of an icon projecting from the menu, is that a user may be able to gain more information about the icon they have pressed. The icons may be a smaller size so as to minimise the visual interruption of the underlying user interface, but the user may choose to temporarily enlarge the icons to receive information about their intended function by displaying the description.

In some example embodiments, the description of the function of an icon is displayed individually projecting from the menu. It may be advantageous to project descriptions of individual icons from the menu rather than all icons, so as to minimise the obscuration of the underlying user interface when displaying descriptions of icons.

In some example embodiments, the user input is a selection operation on an icon.

In some example embodiments, the means for receiving user input is one or more of the group comprising: a touch-sensitive display, track pad, keypad, button, camera and microphone.

In some example embodiments, the method further comprises, in response to detection of an unselection operation in relation to the selected icon, causing the device to cease displaying said description of the function of said icon.

In some example embodiments, causing the device to cease displaying said description of the function of said icon comprises retracting said description.

In some example embodiments, when an unselection operation on the selected icon comprises an operation in relation to a second icon, the method further comprises causing the device to display a description of the function of the second icon.

In some example embodiments, the description projecting from the menu comprises the description being displayed as an animation moving out from the menu, and retracting the description comprises the description being displayed as an animation moving in to the menu until the description ceases to be displayed.

In some example embodiments, the method further comprises, in response to receipt of a user input indicating a menu enlarging operation, causing the menu to be displayed in an enlarged state having an increased width, and displaying a description of the function of each icon. This may provide the user with a way of enlarging or extracting the sidebar to a larger size from the original smaller size. While using small unobtrusive icons may be useful in cases where the meaning of the icons are intuitive or the user is already familiar with the icons and the actions they perform, in some instances, it may be desirable for the user to be able to see a more detailed version of all the icons, without having to individually interact with each one to do so. Therefore it may be advantageous to provide the user with an option to enlarge the icons through a simple user input.

In some example embodiments, when the means for receiving user input comprises a touch-sensitive display, the user input indicates a menu enlarging operation comprises at least one of a touch on a menu expansion icon and a moving gesture on the display directed away from the menu.

In some example embodiments, the method further comprises displaying said menu on said display while maintaining at least a portion of a graphical user interface on said display.

In some example embodiments, the menu is provided as an overlay on the user interface of said application.

In some example embodiments, the graphical user interface comprises a display of one or more user-selected items, and the selection of a menu function causes the function to be carried out on the one or more selected items.

In some example embodiments, where the means for receiving user input comprises a touch-sensitive display, the method further comprises detecting the selection of a menu function in response to receipt of user input comprising a release of a touch on said associated icon or on said description of the function of the icon or both.

In some example embodiments, at least when displayed in an enlarged state, said menu is displayed with a header in which at least some metadata associated with the or each selected item is displayed.

In some example embodiments, the menu is provided in a sidebar.

In some example embodiments, the description of the function of an icon is displayed projecting away from an edge of the display.

In some example embodiments, the method further comprises displaying in the menu in at least an enlarged state of the menu one or more graphical user interface elements representing a portion of an application.

In some example embodiments, the one or more graphical user interface elements is displayed responsive to a user selection of an item in a graphical user interface at least a portion of which is maintained on the display while the menu is displayed.

In some example embodiments, the one or more graphical user interface elements display information obtained from said another application.

In some example embodiments, the one or more graphical user interface elements provide a user of said device with access to functionality provided by said application by the user interacting with the one or more graphical user interface elements without the user having to navigate to said application.

In some example embodiments, when the menu is not displayed in an enlarged state the menu provides a visual indication of the availability of said one or more graphical user interface elements in an enlarged state of said menu.

In some example embodiments, after selection of a function in the menu, all the components of the menu are dismissed, said dismissal being animated.

In some example embodiments, the animated dismissal of said icon of the selected function or the description of the selected function or both is different from the animated dismissal of the other components of the menu. By providing a difference in the animation, this embodiment may provide the user with an indication of which icon has been selected.

In some example embodiments, the difference in the animated dismissal of said icon or description of said selected function and said other components of the menu is a delay in commencement of said animation. By introducing a delay in the animation, this embodiment may provide the user with an indication of which icon has been selected, but also increases the amount of time it remains on the screen, visible to the user, while other icons are removed faster. This is advantageous as it ensures that screen real estate is freed up quickly for the area under the rest of the sidebar, but the part of the sidebar related to the selected action remains longer so the user can still see what has been selected.

In some example embodiments, the difference in the animated dismissal of said icon or description of said selected function and said other components of the menu is a difference in speed of said animation. By providing a difference in speed of the animation, this embodiment provides the user with an indication of which icon has been selected, but also increases the amount of time it remains on the screen, visible to the user, while other icons are removed faster. This may be advantageous as it ensures that screen real estate is freed up quickly for the area under the rest of the sidebar, but the part of the sidebar related to the selected action remains longer so the user can still see what has been selected.

In another embodiment, the present disclosure describes a portable electronic device for providing users of the device with access to content. The electronic device comprises a display, a means for receiving user input, one or more processors, and memory. The memory comprises instructions which, when executed by one or more of the processors, cause the electronic device, in response to receipt of a user input representing a non-modal shortcut menu-summoning operation performed in relation to one or more selectable content items represented in a graphical user interface (GUI) of an application displayed on the display, to: display on the display a sidebar, in juxtaposition with the graphical user interface of said application, the sidebar representing a shortcut menu and containing one or more icons representing operational shortcuts selectable by the user to cause respective operations to be performed in relation to the one or more content items; and permit the user to continue to interact with at least part of the graphical user interface of said application wherein while the sidebar is displayed on the display.

By displaying a sidebar in juxtaposition with the graphical user interface of the application, the presence of the sidebar does not entirely obscure the view of the underlying content to the user and therefore allows the user to still view underlying content while being provided with information regarding what actions are available to the selected content. Furthermore, as the user is permitted to interact with at least part of the underlying graphical user interface while the sidebar is displayed, this ensures that the presence of a sidebar has a minimum negative affect, and is minimally intrusive, regarding the functioning of the underlying application, while still offering its own functions to the user. The sidebar may be in the form of a menu that is displayed on the display adjacent an edge of the display.

In another embodiment, the present disclosure describes an electronic device for providing users of the device with access to content. The electronic device comprises a touch-sensitive display screen for receiving user input, one or more processors, and memory. The memory comprises instructions which when executed by one or more of the processors cause the electronic device to: display on the display screen, in juxtaposition with the graphical user interface of an application, a sidebar representing a shortcut menu. The sidebar containing one or more icons representing operational shortcuts selectable by the user to cause respective operations to be performed in relation to the one or more content items. The memory further comprises instructions that, in response to detection of a press on an operational shortcut icon, cause the device to display an enlarged operational shortcut icon projecting from the sidebar representing the respective operation in place of the pressed operational shortcut icon.

By displaying an enlarged operational shortcut icon projecting from the sidebar to represent the operation in place of the pressed operational shortcut icon, a user is able to gain more information about the operational shortcut icon they have pressed. The operational shortcut icons are originally a smaller size so as to minimise the visual interruption of the underlying user interface, but the user may choose to individually, temporarily enlarge the icons to receive information about their intended function.

In yet another embodiment, the present disclosure describes an electronic device for providing users of the device with access to content. The electronic device comprises means for receiving user input, a display, one or more processors, and memory. The memory comprises instructions which when executed by one or more of the processors cause the electronic device to: cause the device, in response to receiving user input indicative of a delete operation in relation to a selected content item, to display a graphical user interface undo delete widget usable by a user of said device to undo a deletion of said content item.

Providing a user with an undo button after performing a deletion operation allows the user to reverse a deletion they carried out if that deletion was performed unintentionally or if the user later changed their mind. By performing the deletion operation and then presenting an undo option provides advantages over displaying an obtrusive prompt, asking for confirmation to delete before carrying out the deletion function. The embodiment described allows for faster performance of functions like delete, while still giving the user the ability to reverse or prevent any lasting, unwanted effects.

In yet another embodiment, the present disclosure describes an electronic device for providing users of the device with access to content. The electronic device comprises means for receiving user input, a display, one or more processors, and memory. The memory comprises instructions which when executed by one or more of the processors cause the electronic device to: display on the display, in juxtaposition with the graphical user interface of an application, a sidebar representing a shortcut menu, the sidebar containing one or more icons representing operational shortcuts selectable by the user to cause respective operations to be performed in relation to one or more selected content items. The memory further comprises instructions such that, where a selected content item is associated with two or more types of content, said sidebar is displayed at any one time in one of a number of context types each corresponding to a respective one of said types of content associated with said content item and in each of which the sidebar contains only operational shortcut icons that represent operations capable of being performed by the device on the respective type of content, wherein the displayed context type of the sidebar is configured to be changed in response to receipt of a user input indicative of a sidebar context-change operation.

As content may comprise more than one content type, the above embodiment allows a user to perform actions not just related to the primary content type of the content item, but any other content types associated with that content item as well. By providing the user with actions associated with content types other than the primary content type, the user may perform actions that may otherwise not have been possible within the application. Furthermore, by separating the actions by context allows for a more efficient use of screen real estate and less visual confusion to the end user.

In yet another embodiment, the present disclosure describes an electronic device for providing users of the device with access to content. The electronic device comprises a touch-sensitive display screen for receiving user input, one or more processors, and memory. The memory comprises instructions which when executed by one or more of the processors cause the electronic device, when a graphical user interface of an application displays a list of content items and the device receives user input in the form of a long press on a first content item, to display in relation to the selected first content item a graphical user interface widget representing a selection handle, the selection handle widget being draggable by a user to select one or more additional content items adjacent the first content item in the list.

The above embodiment provides the user of a touch sensitive device a mechanism for selecting multiple content items on a user interface. The draggable selection handle widget provides an intuitive way of extending multiple selections.

In yet another embodiment, the present disclosure describes an electronic device for providing users of the device with access to content. The electronic device comprises means for receiving user input, a display, one or more processors, and memory. The memory comprises instructions which when executed by one or more of the processors cause the electronic device to: display on the display, in juxtaposition with the graphical user interface of an application, a sidebar representing a shortcut menu. The sidebar contains one or more icons representing operational shortcuts selectable by the user to cause respective operations to be performed in relation to one or more selected content items. The memory further comprises instructions to: adjust the positioning of at least one of the one or more selected content items so as to reduce the obscuration of the items by the sidebar.

By providing a mechanism for reducing the obscuration of content items by the sidebar allows for allow a full-functioned user interface to be provided that minimises the amount of screen real estate used and aims to minimise how much the actual content, especially content of current interest to the user, is obscured by its presence.

In some example embodiments, the memory may further comprise instructions which when executed by one or more of the processors cause the electronic device, in response to receipt of a user input representing a modal shortcut menu-summoning operation performed in relation to one or more selectable content items represented in a graphical user interface of an application displayed on the display, to: display said sidebar on said display, and cease displaying said sidebar in response to receipt of a user input representing a shortcut menu-dismissing operation, such that the user is thereafter able to continue to interact with the graphical user interface of said application. This example embodiment provides the user with the option of a modal user interface element which can provide greater control over the actions that can be performed and can require less complex user input from the user. Furthermore, mechanisms are provided for dismissing the sidebar when the user no longer wishes to access it, allowing the user to free up screen space when they desire.

In some example embodiments, the means for receiving user input comprises a touch-sensitive element provided in relation to said display to provide a touch-sensitive display. By making the means for receiving user input a touch-sensitive element, the user is able to perform easy, intuitive actions to interact with content, such as gestures like tapping, pressing, dragging and multi-touching.

In some example embodiments, the user input representing a modal shortcut menu-activating summoning gesture operation is a static long press gesture on the content item for a period exceeding a long press threshold time value. The long press threshold time value can also be varied dependent on monitored frequency of use of said gesture. Varying this threshold time, based on the frequency that the user performs gestures, results in a user interface that adapts to the behaviour of the user, where when it is apparent that a user is repeating the same action, the user interface reduces the time required to perform the action again, thus allowing the user to perform repeated actions faster. Such an action could be related to initiating the sidebar or it could be related to performing an action on the content items themselves.

In some example embodiments, the memory further comprises instructions such that, if the user releases the static long press gesture without beforehand dragging on the touch-sensitive display, the sidebar is pinned to an edge of a useable area of the display such that it continues to be displayed after the static long press gesture is released. By providing the ability to 'pin' the sidebar to an edge of a useable area, the user is able to view the sidebar without performing any further continuous user input (such as continuing the long press), as the sidebar remains pinned to the display. This would be advantageous particularly to the user who is not yet familiar with the available shortcuts on the sidebar or who wishes to perform user input actions.

In some example embodiments, where a user has not yet released said static long press gesture, the user input representing a shortcut menu-dismissing operation is a drag continuing from said static long press and a subsequent release of said drag on an area of the touch-sensitive display screen off the sidebar. This embodiment provides the user with a means for dismissing the sidebar with a minimum amount of effort. This would be particularly useful in the instance where the user no longer wishes for a sidebar to be displayed or has unintentionally performed a long press and requires a way of dismissing the sidebar to increase screen space available to the underlying application.

In some example embodiments, where a user has already released the static long press gesture without beforehand dragging on the touch-sensitive display, said user input representing a shortcut menu-dismissing operation is a tap on an area of the touch-sensitive display screen off the sidebar. Once the sidebar has already been pinned by releasing from the long press, the user may require a means for dismissing the sidebar, even though it is in a pinned state. One way of providing a user with this functionality is to provide an area of the display for the user to tap on to cause the pinned sidebar to be dismissed.

In some example embodiments, the user input representing a non-modal shortcut menu-summoning operation is one or more of: a static short press gesture on a content item for a period exceeding a short press threshold time value followed by a drag in the direction of the location of the shortcut menu; and a static short press gesture item for a period exceeding a short press threshold time value on a content item followed by a concurrent touch on the display where the shortcut menu will appear. This embodiment provides a means for summoning the sidebar more quickly. Rather than requiring a long press, only a short press followed by a drag in the direction of the location of the sidebar is required to cause the sidebar to be summoned. Another fast method is provided to the user in this embodiment, as on performing a short press, the user can perform a concurrent touch on the display where the shortcut menu will appear even before the menu appears and, furthermore, without the need to release the short press.

In some example embodiments, the memory further comprising instructions to cease displaying the sidebar if said touch continued from said static short press gesture is released. This embodiment provides the user with a means for dismissing the sidebar with a minimum amount of effort (simply releasing from the short press before it becomes a long press). This would be particularly useful in the instance where a user where the user no longer wishes for a sidebar to be displayed or the user has unintentionally performed a short press, and wishes to free up available screen space for the underlying application.

In some example embodiments, the act of ceasing to display the sidebar is only carried out if no user input representing an interaction with said sidebar is received. In some instances, a user may still intend to perform actions on the sidebar, even if they have released the short press, therefore this embodiment provides for users who have released from the short press, but have already begun to act with the sidebar.

In some example embodiments, the memory further comprising instructions to cease displaying the sidebar as a result of a user selecting an operational shortcut icon in the sidebar. In this embodiment, when a user selects an operational shortcut icon, the action associated with the shortcut icon is therefore performed. Once the action has been performed the sidebar may no longer be required and so, in this embodiment, the sidebar is automatically dismissed as a result of the user selecting the operation shortcut icon. This ensures that screen space is not wasted displaying a sidebar when it is no longer required.

In some example embodiments, the user input representing a non-modal shortcut menu-summoning operation performed in relation to the one or more content items displayed in the graphical user interface of an application also causes a selection of said one or more content items. As a user input representing a non-modal shortcut menu-summoning operation is preformed in relation to specific content items displayed on the screen, in this embodiment the content items to which the user input is related is selected so that the user may also perform actions on the content items using the sidebar.

In some example embodiments, the user input representing a modal shortcut menu-summoning operation performed in relation to the one or more content items displayed in the graphical user interface of an application also causes a selection of said one or more content items. As a user input representing a modal shortcut menu-summoning operation is preformed in relation to specific content items displayed on the screen, in this embodiment the content items to which the user input is related is selected, so that the user may also perform actions on the content items using the sidebar.

In some example embodiments, the device is a portable electronic device. A number of the advantages of the embodiments provided are particularly advantage in portable electronic devices where screen space is more limited than in larger electronic devices. However, the disadvantages associated with the smaller screen space of portable device are countered by the increased portability of the electronic device.

In some example embodiments, the instructions further cause the device, when the graphical user interface of the application displays a list of content items and the device receives user input in the form of a long press on a first content item, to display in relation to the selected first content item a graphical user interface widget representing a selection handle, the selection handle widget being draggable by a user to select one or more additional content items adjacent the first content item in the list. By allowing a user to initialise a selection handle that can be dragged to select additional content items adjacent to the first content item, the user is provided with an intuitive and fast way of selecting multiple content items.

In some example embodiments, the instructions further cause the device, in response to receiving user input indicative of a multiple-select operation, to allow a user to select/unselect plural content items presented in the graphical user interface of the application by touching on said content items. This embodiment provides the user with an intuitive way of altering the selection of multiple content items, whereby the user performs a multiple-select operation and can subsequently perform simple touches on said content items to add or remove them from the selection.

In some example embodiments, the user input indicative of a multiple-select operation is a touch on a multiple-select operation icon. In this embodiment, the user is provided with an icon indicating where the user should touch to enable the above multiple-selection mode, thereby allowing a more easy way of enabling the mode.

In some example embodiments, the instructions configure the device to attempt to perform the respective operations on the selected one or more content items indicated by each operational shortcut icon in response to receipt of user input representing an operational shortcut-activating operation. This embodiment provides a user with a means for performing operations on content items of their choosing by performing a user input on the shortcut icon associated with the operation, thereby giving the user a simple way of performing actions on content of their choosing.

In some example embodiments, the operational shortcut-activating gesture is a release of a touch on said icon. The gesture required in this embodiment is chosen to be a simple one to perform, allowing the user an easy way of performing actions on content.

In some example embodiments, the instructions further cause the device, in response to receiving user input indicative of a delete operation in relation to a selected content item, to display a graphical user interface undo delete widget usable by a user of said device to undo a deletion of said content item. In this embodiment, once the deletion has occurred, an 'undo' option is provided to the user to cover the situation where the deletion was by accident or the user changed their mind. This undo solution, therefore, allows for a faster completion of actions, as confirmation is not required, while still allowing for easy correction if the user carried out the action by mistake or has since changed their mind.

In some example embodiments, the undo delete widget continues to be displayed until the expiry of a persistence time period the commences once the user starts to interact with the user interface of said application. The proposed undo solution does not steal focus and is unobtrusive, as it will automatically disappear when it infers that the user does not wish to carry out an undo command (as indicated by the user starting to interact with the user interface of the underlying application).

In some example embodiments, in response to receiving user input indicative of a delete operation in relation to a selected content item the representation of the selected content item in the user interface is altered to indicate its deletion. By providing an indication that the selected content item has been deleted, the user is informed of the deletion and can therefore be made aware of the action that has been performed without causing the user confusion.

In some example embodiments, in response to receiving user input in relation to said undo delete widget, said selected content item thereafter continues to be represented in said graphical user interface and said content item is retained. By making a user input in relation to the undo delete widget, the user can be provided with a graphical representation of the previously removed or deleted content item again, making it clear to the user that the content item has been retrieved.

In some example embodiments, the user input indicative of a delete operation in relation to a selected content item comprises a release of a touch on a delete shortcut icon provided on said sidebar. This embodiment provides the user with an easy to perform action to indicate a desire to delete content on a touch screen interface.

In some example embodiments, after receiving said user input indicative of a delete operation, said delete shortcut icon is animated to transform into said undo delete widget. By animating the delete shortcut icon to the undo delete widget makes it clear to the user that the undo widget is directly related to the delete icon and therefore, conveys to the user that interacting with the undo widget is likely to reverse the actions of the previous delete shortcut icon.

In some example embodiments, the undo delete widget is anchored to said graphical user interface of said application. Anchoring the undo delete widget allows the widget to remain visible to the user even if the user starts scrolling or otherwise modifying the underlying application, therefore continuously providing the user with an opportunity to perform the undo until the widget is no longer displayed to the user.

In some example embodiments, an operational shortcut can be performed in relation to one or more selected content items by the user performing a drag from said one or more selected content items onto said shortcut icon. Allowing the user to drag content items onto operational shortcut icons to perform actions on the dragged content items provides the user a fast and intuitive way of performing actions.

In some example embodiments, during said drag the graphical user interface of said application scrolls and/or pans in accordance with said drag. As the application is made to continue to scrolling and/or panning while the user is dragging a content item, it ensures that the content items in question are still close to the user's finger, ensuring the user is aware which content item an action would be performed on, and also allows the user to explore the contents of the underlying application while considering actions to perform on the selected content items.

In some example embodiments, there are further instructions that, in response to detection of a press on an operational shortcut icon, cause the device to display an enlarged operational shortcut icon projecting from the sidebar representing the respective operation in place of the pressed operational shortcut icon. This embodiment provides the user with a way of enlarging or extracting the sidebar to a larger size from the original smaller size. While using small unobtrusive icons is useful in cases where the meaning of the icons are intuitive or the user is already familiar with the icons and the actions they perform, in some instances, however, it may be desirable for the user to be able to see a more detailed version of all the icons, without having to individually interact with each one to do so. Therefore it would be advantageous to provide the user with an option to enlarge the icons through a simple user input.

In some example embodiments, the sidebar is provided as an overlay on the user interface of said application. By overlaying the sidebar on the user interface of the application, screen real estate is more efficiently utilised.

In some example embodiments, at least part of the sidebar is at least partially transparent. When the sidebar is made partially transparent, the user may still see the underlying application as well as the sidebar, thereby providing an even more efficient use of screen real estate as information regarding the sidebar and underlying application can be provided to the user in the same region of the screen.

In some example embodiments, the act of displaying the sidebar includes the sidebar being animated to appear on the display. By animating the sidebar's appearance on the screen, the initiation of the sidebar is made more noticeable to the user and indicates that a change has occurred that the user may react to.

In some example embodiments, the memory further comprises instructions to: in response to receipt of a user input indicating a sidebar expansion operation, cause the sidebar to be displayed in an extracted state having an increased width and containing enlarged operational shortcut icons in place of respective operational shortcut icons. It would be advantageous to provide the user with an option to enlarge the icons through a user input so as to provide the user with more information or functionality than with a sidebar of smaller size.

In some example embodiments, when the sidebar is displayed in an extracted state the appearance of the graphical user interface of the application is adjusted such that at least part of the or each content item is visible in an area away from the sidebar. While the sidebar provides information and useful functions to the user, it is desirable for it to minimise its obstruction of the underlying application and content. Therefore, in this embodiment, the content item itself is moved so that at least some of it remains visible should the sidebar move to obstruct the view of the content item.

In some example embodiments, when the selected content items are larger than the remaining visible area of the graphical user interface, the selected content is aligned to the side of the remaining visible area opposite the sidebar. This embodiment aims to maximise the visibility of content items that are too large to fit completely in the available space of the application that is not obscured by the sidebar.

In some example embodiments, when the selected content items are smaller than the remaining visible area of the graphical user interface, the selected content is aligned to the centre in the remaining visible area. This embodiment aims to ensure that the selected content item is in the most clearly visible region of the available space of the application, by placing it in the middle of the area not obscured by the sidebar.

In some example embodiments, when the selected content items are aligned near an edge of the graphical user interface adjacent the sidebar, the alignment is retained. This embodiment aims to maximise visibility of the content item, while at the same time minimising its change in position in the case where the content item is already aligned or close to the sidebar.

In some example embodiments, the user input indicating a sidebar expansion operation is a touch on a sidebar expansion icon and/or a swipe from the display directed away from the sidebar. This embodiment provides the user a number of ways of enlarging the sidebar on a touchscreen device, namely by performing an easy to perform touch gesture on an expansion icon or by performing an intuitive swipe gesture.

In some example embodiments, in the extracted state said sidebar is provided with a header in which at least some metadata associated with the or each content item is displayed. By providing a header in the expanded sidebar, this embodiment provides additional information to the user about the selected content item in a region of space that would otherwise be unused, thereby making an efficient use of screen real estate.

In some example embodiments, the user is permitted to continue to interact with the graphical user interface of said application in such a way that user input performed in relation to the area of the graphical user interface of said application visible with the sidebar present has the same effect on the application as said input would have had before the sidebar was displayed. By allowing a user to interact with the remaining visible area of the underlying application as if the sidebar was not there ensures that the sidebar is as unobtrusive as is possible while still providing functionality and information to the user.

In some example embodiments, the operational shortcut icons displayed in the sidebar are ordered in a prioritised list. Ordering the list of shortcuts can allow for more efficient interactions. If prioritised by frequency of use (where it is either the frequency of use by the individual or generally), the user knows where to look on the list for the most common actions, for example, looking to the top of the list for the action they are statistically most likely to perform. This allows for faster actions as the user will be able to anticipate where on the sidebar they are likely to direct a user input to perform an action, even before the sidebar has appeared.

In some example embodiments, the sidebar contains only operational shortcut icons that represent operations capable of being performed by the device on the type of content of the or each selected content item. By only showing icons that can be performed on the selected content item, space on the sidebar is not wasted by icons that cannot be performed.

In some example embodiments, the sidebar contains operational shortcut icons that represent all the operations capable of being performed by the device on the or each type of content of the selected content item or items. This embodiment displays icons associated with all the operations that can be performed on a selected content item or items, thus providing the user with the ability to perform any action on the selected item.

In some example embodiments, the selection of the operational shortcut icons to be displayed in the sidebar is dependent on the type or types of content of the selected content item or items. In this embodiment, content items are categorised into 'content types', each of which have a selection of operational shortcut icons associated with them. Therefore, when displaying a list of operational shortcut icons associated with a selected item, to determine which icons to be displayed, the user interface need only know the 'content type' of the content item, rather than individually determining what actions can be performed on that content item. This reduces the processing power required for determining the selection of icons and also provides the user with a more consistent experience when dealing with content items of the same type.

In some example embodiments, the memory further comprises instructions such that, where a selected content item is associated with two or more types of content, said sidebar is displayed at any one time in one of a number of context types each corresponding to a respective one of said types of content associated with said content item and in each of which the sidebar contains only operational shortcut icons that represent operations capable of being performed by the device on the respective type of content, wherein the displayed context type of the sidebar is configured to be changed in response to receipt of a user input indicative of a sidebar context-change operation. It is possible for selected content items to hold data or have links to multiple content types and therefore this embodiment provides a way for dealing with content items that contain multiple content types and which would require different shortcut menu items based on the desired context. By providing separate, interchangeable context states for the sidebars depending on content type, an intuitive, cleaner user interface is provided that allows users to perform a multitude of actions without cluttering the display with a unrelated icons and without necessarily having to leave the application to initiate actions from an application better suited for the content type in question.

In some example embodiments, the instructions to display in the sidebar one or more fragments representing a portion of another application different from the application currently in focus on the display. While a sidebar is being displayed in juxtaposition with an application, this embodiment provides a way for the user to have access to information or functions of other applications that may be relevant to the selected content item, without having to leave the original application.

In some example embodiments, the fragment is displayed responsive to the type of content of said content item. By ensuring that the fragment displayed is responsive to the type of selected content item, this embodiment ensures that only fragments that contain information or functions that could be related to the selected content item are displayed, therefore saving screen real estate as unneeded fragments are not displayed.

In some example embodiments, the fragment presents information obtained from said another application in said sidebar. If a fragment presents information obtained from another application, this enables the user to access the information without having to leave the application, thereby improving efficiency for the user and reducing system load by reducing the need to start and stop applications to access the information and return to the original application.

In some example embodiments, the fragment provides a user of said device with access to functionality provided by said another application by interacting with the fragment without the user having to navigate away from said current application. If a fragment presents functionality of a separate application, this enables the user to perform functions without having to leave the application, thereby improving efficiency for the user and reducing system load by reducing the need to start and stop applications to access the function and return to the original application.

In some example embodiments, the fragment is displayed only when said sidebar is displayed in an extracted state having an increased width and containing enlarged operational shortcut icons in place of respective operational shortcut icons. In this embodiment, fragments are only displayed in the extracted state of the sidebar, ensuring that the non-extracted state of the sidebar is not over cluttered with information and functionality relating to separate application.

In some example embodiments, the sidebar provides a visual indication of the availability of said fragment in said extended state of said sidebar. This embodiment provides a way for the user to know what fragments they can utilise while in an extended state of a sidebar by providing the user with a visual indication of the availability of the fragment.

In some example embodiments, the instructions which when executed by one or more of the processors configure the device such that any of one or more of a plurality of applications can cause said sidebar to be displayed in response to receiving said user input performed in relation to one or more selectable content items represented in a graphical user interface said applications. In this embodiment, the sidebar is available on a plurality of applications, thereby providing the user with a consistent experience across multiple applications. By encouraging consistency in the user experience, the user can carry out functions more efficiently as once they know how to perform a sidebar-related function in one application, they will be able to perform similar actions in other applications, without having to relearn user interactions for that application. This can also result in lower memory usage as multiple applications can share the same code or have access to the same API.

In some example embodiments, the sidebar is always displayed in the same location on the screen, providing the user with a consistent user experience and allowing the user to anticipate where interactions might happen.

In some example embodiments, as a result of a user selecting an operational shortcut icon in the sidebar, the sidebar provides a visual indication that said operational shortcut icon has been selected, thereby making it clear to the user that their selection of the icon has resulted in an action relating to the shortcut icon.

In some example embodiments, after the selection of the operational shortcut icon in the sidebar, all the components of the sidebar are dismissed, said dismissal being animated. Dismissing the sidebar after an icon has been selected ensures that screen space is not wasted, as once an icon has been selected and the associated action performed, there is no need to display the sidebar. By animating this dismissal it is made clear to the user that an action has now been performed and the sidebar is no longer required.

In some example embodiments, the animated dismissal of said selected operational shortcut icon is different from the animated dismissal of the other components of the sidebar. This difference in animation provides the user with an indication of which icon has been selected and therefore which action is being performed.

In some example embodiments, the difference in animated dismissal of said selected operational shortcut and said other components of the sidebar is a delay in commencement of said animation and/or a difference in speed of said animation. By providing a difference in speed or introducing a delay in the animation, this embodiment provides the user with an indication of which icon has been selected, but also increases the amount of time it remains on the screen, visible to the user, while other icons are removed faster. This is advantageous as it ensures that screen real estate is freed up quickly for the area under the rest of the sidebar, but the part of the sidebar related to the selected action remains longer so the user can still see what has been selected.

Other example embodiments of the present disclosure will be apparent to those of ordinary skill in the art from a review of the following detailed description in conjunction with the drawings, and may be related to a computer implemented method as well as the already described electronic device.

Definitions

References are made to content, specifically content items and content types. In this specification, content items (also referred to as 'items') are defined as any entities displayed to the user that can be selected and can have actions performed on the data or media that they represent. For example, in many of the illustrative examples used, email messages are considered content items because they can be selected by the user interface and there are a number of actions (such as 'forward' and 'reply') that can be applied to them. Similarly, images are also presented as content items in the illustrative examples as they can be selected and have actions such as 'share' or 'delete' performed on them. The content items used in these examples are not limiting, and are deliberately chosen to be simple examples for ease of illustration. More complex, abstract examples of content may include grid locations on a mapping application. One could select a random point on a mapping software, and that would be associated with a geographical coordinate for which there may be actions that can be applied (such as 'place marker' or 'calculate directions to' action). Another example of content item could be an application itself, as on selecting a visual representation of the application, the user can perform actions on it such as 'uninstall'. Content type allows for a categorisation of content to more easily determine what actions would be available for each individual content item. Generally content items of the same type will have similar actions that can be performed on them.

Many of the proposed solutions in this application rely on user input. While the term user input is very broad, in the illustrative examples contained herein, a number of types of user input are used. However, the user inputs in the examples should not lead to the exclusion of other user inputs from the scope of the application when reference is made to a user input or gesture. A gesture includes a static or moving touch detected by a touch-sensitive display, a 3-dimensional (3D) spatial movement detected by spatial sensors, a touch or 3D spatial movement detected by an optical sensor, an audible input, including a voice command, detected by a speech or audible recognition device or microphone, depression of a physical key or button, and so forth. In addition, a camera may be utilised to capture and interpret gestures, for example eye movements for controlling user input. Other types of gestures may be successfully utilized. While the examples used are generally described with reference to touch screen devices, the proposed solutions can be used with other user input means such as track pads, mouse pointers, optical sensors, speech or audible recognition devices, including one or more microphones, physical keys, and one or more cameras. The concept of touching a point on the surface of a touch screen can be easily translated to other user interface gestures such as clicking on a point on a screen with a mouse, or pointing at a point with an off-surface gesture. The use of touch screen gestures in the example embodiments are purely for illustrative purposes and the scope of the proposed solutions are not limited to these user interfaces or these specific gestures.

When stating that a gesture or operation is 'performed in relation to a content item', this means that the gesture or operation was directed towards a specific content item. For example, while a user may be operating a mouse on a surface separate from the surface of the display of the electronic device, those movements of the mouse may be performed by the user in relation to content displayed on the screen, even if there is no physical connection between the two, only a logical or virtual one.

The term sidebar is used to describe the user interface element that represents the shortcut menu. A sidebar may be an element located at the side of the screen of the electronic device or it may be at the side of an application window or some other virtual edge within the screen. The term sidebar does not limit the element to being at any particular side, as it may be positioned at the top or bottom, or any conceivable edge of a physical or logical boundary.

Modal and non-modal is used to differentiate the behaviour of certain types of user interface elements. If a user interface element is modal, it means that on initiating that element, the rest of the application enters into a different 'mode' where the behaviour is different from that if the user interface element had not been initiated. For example, an element that, when initiated prevents the use of the underlying user interface (for example by greying it out and removing its responsiveness to user input), would be considered modal. A non-modal element, on the other hand, is one that, when initiated, still permits the use of the underlying user interface as though the element were not there (in other words, its responsiveness to user input is maintained), except for the regions that are directly affected by the initiated element. For example if a side menu appears that can be interacted with, but still allows the user to interact with the elements of the underlying user interface that are not obscured by the side menu, then the side menu would be considered non-modal.

The side menu may also be considered non-modal if a user is permitted to perform all or a subset of interactions that they could perform before the appearance of a menu. For example, a user may be able to scroll the view of the underlying user interface while a side menu is displayed, and may or may not be able to perform other interactions. The responsiveness of the underlying user interface in a non-modal system need not be restricted to interactions with selectable items displayed in the user interface, but may also include responsiveness to general user interactions such as changing the view of an application, or performing actions directed to the displayed application. For example, the user input may be for performing an action in relation to the graphical user interface. The action may be a navigation action, for example to cause navigation to different graphical user interface panes or windows. Such an action may include a peek operation to peek at a partial view of another application. For example, if more than one application is running and different application windows or panes are overlaid, the action may be to move a currently displayed pane to peek at an underlying pane. Such actions may cause the result of the side menu being dismissed. However, the action itself is in relation to the graphical user interface or the selectable items displayed, and is not solely in relation to the menu itself.

The purpose of defining modality is that modal interface elements 'steal focus' and affect the application as a whole when initiated, whereas a non-modal interface is able to operate at the same time as other interface elements without affecting their behaviour. Modal interfaces often require more user interactions when compared with non-modal interfaces because the user must take positive action to dismiss the initiated element and return the interface to the state before the modal element was initiated.

Reference will now be made to FIG. 1 which illustrates an electronic device 201 in which example embodiments described in the present disclosure can be applied.

In the illustrated example embodiment, the electronic device 201 is a communication device and, more particularly, is a mobile communication device having data and voice communication capabilities, and the capability to communicate with other computer systems; for example, via the Internet.

Depending on the functionality provided by the electronic device 201, in various example embodiments the electronic device 201 may be a multiple-mode communication device configured for both data and voice communication, a mobile telephone, such as a phone, a wearable computer such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processors 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touch-screen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate. The wireless network 101 may, for example, be a cellular (such as GSM, GPRS, CDMA and EDGE) and/or a non-cellular network (for example local WiFi networks).

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such a user interface (UI) module. In the example embodiment of FIG. 1, the UI module is implemented as a stand-alone application 225. However, in other example embodiments, the UI module could be implemented as part of the operating system 223 or another application 225 or collection of applications.

The UI module may be provided as a computer software product. The computer software product may be provided in, on or supported by a computer readable medium which could be provided as all possible permanent and non-permanent forms of computer readable medium either transitory in nature, such as in a data transmission signal for example sent over the internet, or non-transitory in nature such as in the RAM 246 of the device 201 or other, non-volatile storage such as memory 230. On the other hand the computer readable medium may be a non-transitory computer readable medium comprising all computer-readable media, with the sole exception being a transitory, propagating signal.

Figure 2:
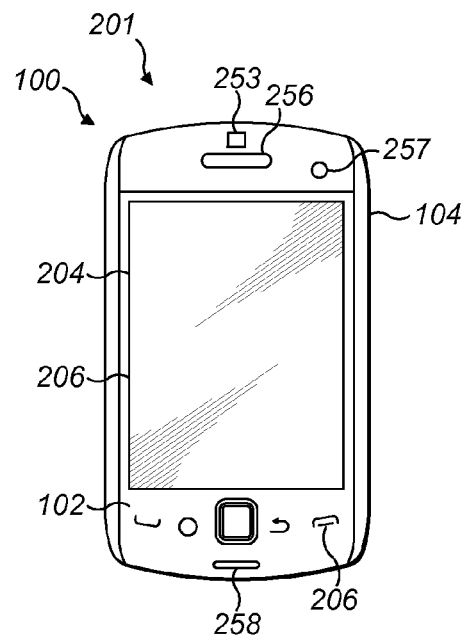
FIG. 2 is a front view of a phone in accordance with example embodiments of the present disclosure.

Referring now to FIG. 2, the electronic device 201 could be a cellular (or mobile) phone 100. For example, the phone 100 may have the ability to run third party applications which are stored on the phone.

The phone 100 may include the components discussed above with reference to FIG. 1 or a subset of those components. The phone 100 includes a housing 104 which houses at least some of the components discussed above with reference to FIG. 1.

In the example embodiment illustrated, the phone includes a display 204, which may be a touchscreen display which acts as an input interface 206. The display 204 is disposed within the phone 100 so that it is viewable at a front side 102 of the phone 100. That is, a viewable side of the display 204 is disposed on the front side 102 of the phone. In the example embodiment illustrated, the display 204 is framed by the housing 104.

The example phone 100 also includes other input interfaces 206 such as one or more buttons, keys or navigational input mechanisms. In the example illustrated, at least some of these additional input interfaces 206 are disposed for actuation at a front side 102 of the phone.

Example Tablet Electronic Device

Figure 3:
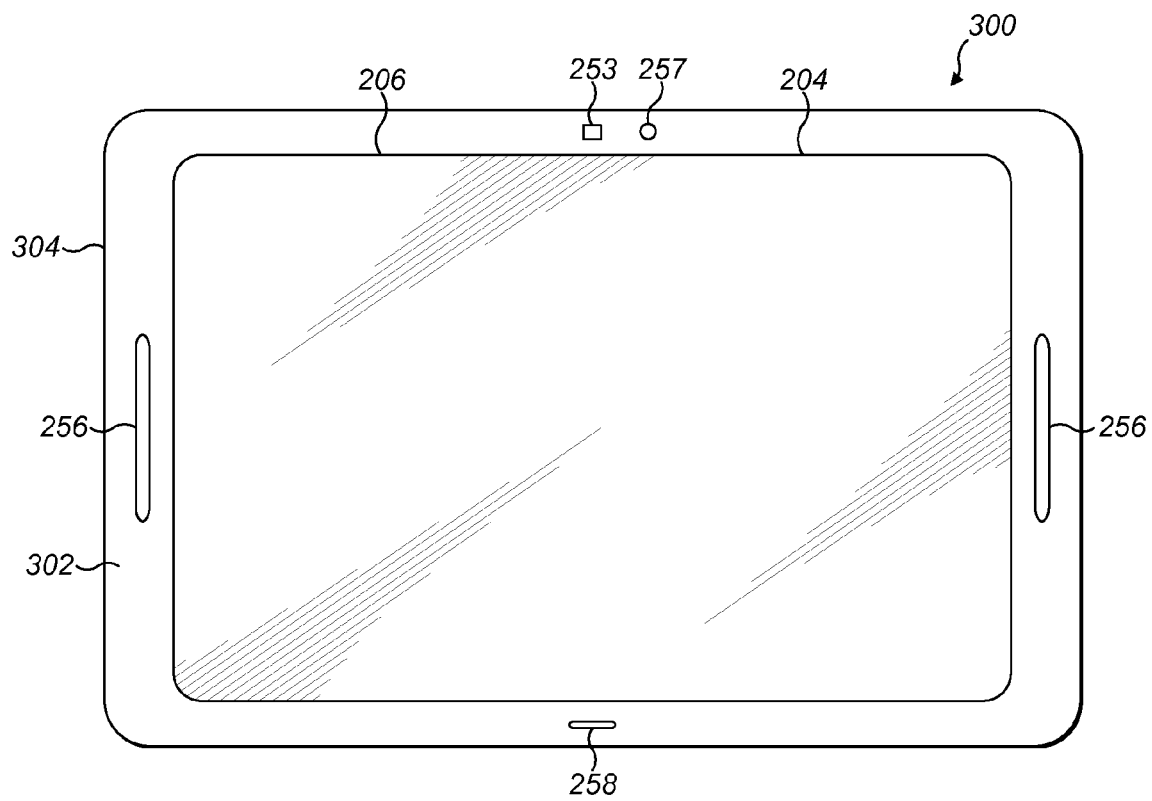
FIG. 3 is a front view of a tablet computer is accordance with example embodiments of the present disclosure.

Referring now to FIG. 3, a front view of another example of an electronic device 201, a tablet computer 300, is illustrated. The tablet computer 300 may include many of the same features and components of the phone 100 of FIG. 2. However, the tablet computer 300 of FIG. 3 is generally larger than the phone 100. The tablet computer 300 may include the components discussed above with reference to FIG. 1 or a subset of those components. The tablet computer 300 includes a housing 304 which houses at least some of the components discussed above with reference to FIG. 1. The tablet computer 300 could support cellular wireless communication and/or non-cellular wireless communication.

The tablet computer 300 includes a display 204, which may be a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

Sidebar Menu System

Figure 4:
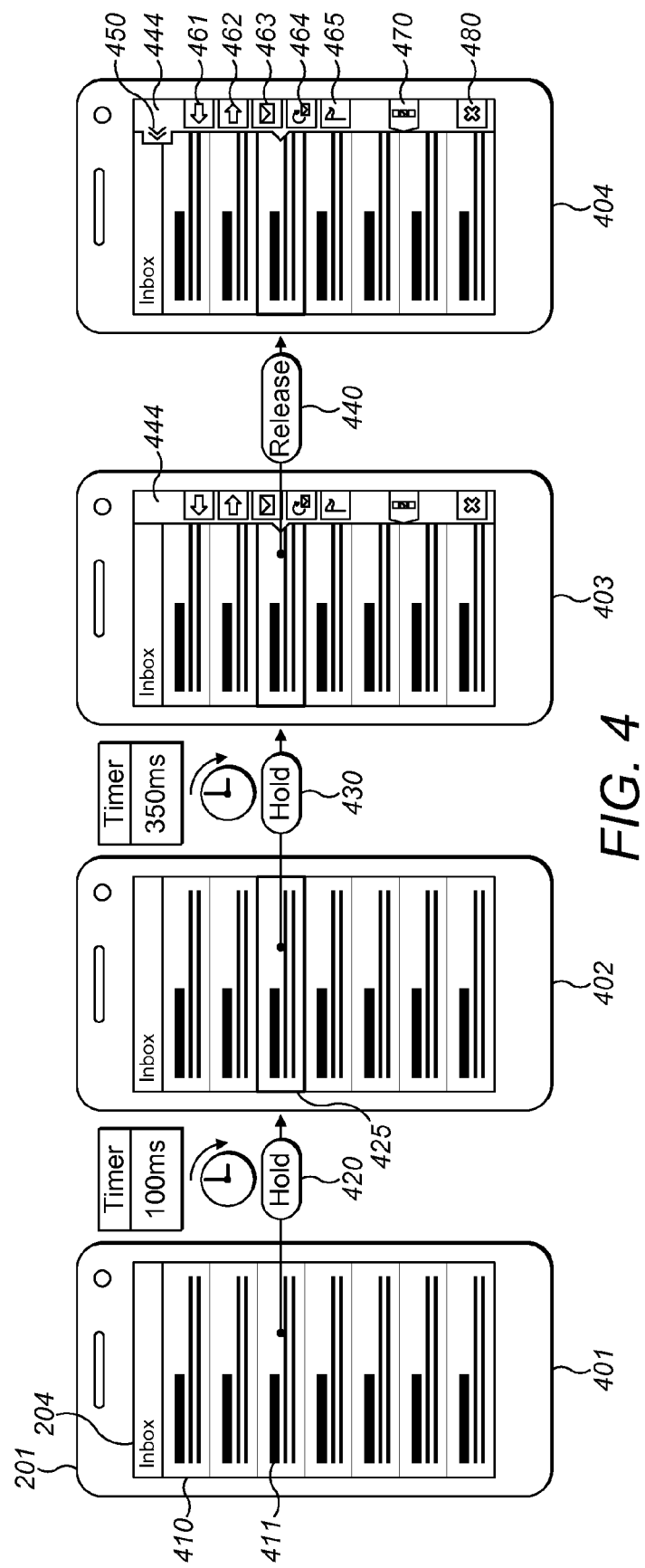
FIG. 4 illustrates an electronic device in accordance with an embodiment showing the operation of a user interface for initiating a sidebar.

Reference will now be made to FIG. 4 which illustrates the initiation of a sidebar 444 on an electronic device 201. In this example, state 401 shows an application displayed on the display 204 of the electronic device 201, where the application presents a list of content items 410. A user may provide a user input in relation to one of the content items 411. In the case where the display 204 is a touchscreen, this user input could be a touch on the content item 411. Alternatively, the user input may be any other user interaction in relation to the content item 411, such as a press on an associated position of a trackpad, or an off-surface gesture toward the content item 411. In this illustrative example, the gesture is pressing on or performing an operation on the content item 411 for a short amount of time, for example 100 milliseconds. Pressing down on the content item 411 for this short period of time shall be referred to as a 'short press' 420.

On pressing down on this content item for 100 ms, the content item 411 becomes 'marked' or 'selected'. Some indication may be provided to the user to show that the content item 411 is now marked, such as by providing a border 425 around the content item 411 as shown in state 402. This indication may be in the form of audible or tactile feedback or any combination of output available to the electronic device 201 for portraying to the user that the unmarked content item 411 is now marked.

If the user performs a gesture exceeding a time interval, also referred to as a 'long press' 430, in relation to the content item, then there is a further change to state 403. This 'long press' 430 may be initiated either by holding down on a content item continuously for 100 ms and then a further 350 ms for a total of at least 450 ms, or it can be initiated by holding down on an already marked item for 350 ms. Other user inputs may be considered as equivalent to a long press, for example by repeating an operation or gesture on a content item may be considered as a gesture exceeding a time interval. For example, a double or triple click of a button or mouse may be considered as a 'long press'. Once the long press 430 has occurred, a sidebar 444 appears. The sidebar 444 may appear instantly or through a transitional animation, such as by sliding in from off the screen or outside the window of the present application in which the sidebar 444 is invoked. Once the user releases 440 from the 'long press' there is a further transition to state 404 where the sidebar is 'pinned' to the screen, as can be indicated, for example, by the greying out of all or part of the underlying content or by the addition of a graphical element 450 to the sidebar 444. On the sidebar 444 becoming 'pinned' the greying out of all or part of the underlying screen may also indicate to the user that they cannot interact with that greyed out portion as they normally would until the sidebar has let fthe 'pinned' mode.

The sidebar 444 contains a number of icons related to or representing actions (also referred to as functions or operations) that can be performed on or in relation to the selected content item 411. For example, in an email application, on selecting an email message content item, the icons displayed on the sidebar 444 may be shortcuts to 'reply' 461, 'forward' 462, 'mark unread' 463, 'move' 464, 'flag' 465 or 'delete' 480 actions. Icons that are not necessarily related to the selected item 444, but rather to the sidebar 444 or underlying application itself may also be included, such as the shortcut icon for the 'select more' 470 action which will be discussed later.

The icons displayed on the sidebar 444 may be placed in a prioritised list. The icons may be prioritised, for example, by the frequency of use of the associated action by the specific user, or the established frequency of use by a larger group of users, thereby ensuring that the most common icons are listed with priority to less commonly used icons. The sidebar may only display icons related to operations that can be performed on the selected content item, and therefore ensuring that no icons are displayed that cannot be acted upon (thereby preventing space on the sidebar being unnecessarily used up). The sidebar may display icons relating to all the operations that can be performed on the selected item, thereby providing the user the ability to easily perform any action that can be performed on a content item when they select it. These operations may be limited to the operations that can be performed by the underlying application itself or a number of applications on the electronic device. The sidebar may display icons related to operations that, for one reason or another is not, available to perform and therefore is displayed, but greyed out or disabled.

Once the user has reached state 404 by releasing the 'long press', the user may select one of the icons on the sidebar 444 to initiate the action associated with the shortcut icon. For example, selecting the 'reply' icon 461 may create a new message in reply to the email message currently selected, or selecting the 'delete' icon 480 could either delete the selected content item 411 or provide the user with an option to delete the selected content item 411. In this description release of a long press may be equivalent to the absence of further repetition of a gesture, or may be the detection of another user input from another button or input means.

On selecting one of the shortcut icons on the sidebar 444, the sidebar 444 may disengage and disappear from the screen. Alternatively, the sidebar 444 may remain until the action associated with the shortcut icon or a certain step of the associated action is completed. A further alternative is that the selection of one of the shortcut icons may result in a change of state of the sidebar.

Figure 5:
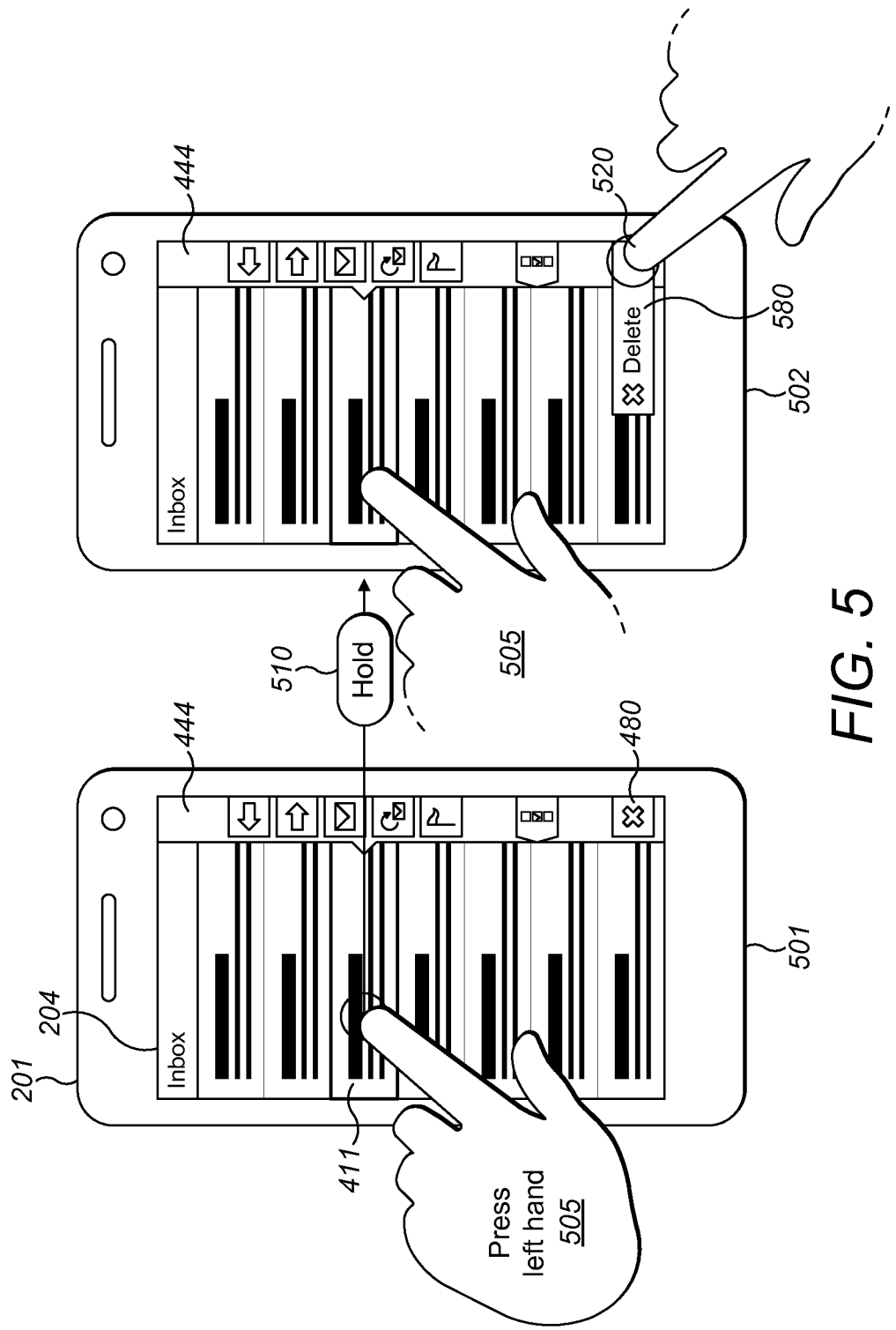
FIG. 5 illustrates an electronic device in accordance with an embodiment showing the use of a multitouch gesture for interacting with a sidebar.

The user interaction illustrated in FIG. 4 involves a gesture exceeding a time interval, also referred to as a 'long press' of a content item 411 to bring up a sidebar 444 which remains 'pinned' to the screen after the user releases from the 'long press'. On release from the 'long press' the user is free to select one of the shortcut icons from the sidebar 444 to perform an associated action. An alternative to this basic user interaction is illustrated in FIG. 5, where multitouch is used to initiate and interact with a sidebar 444. One hand, for example the left hand 505, can be used to press down on a content item 411. Once this press has continued long enough to be considered a 'long press' which in this example is after 450 ms, the state 501 is reached where the sidebar 444 appears with one or more shortcut icons relating to actions associated with the content item 411 selected.

At this point, rather than releasing the left hand 505 and therefore 'pinning' the sidebar to the screen, the user may alternatively use another hand or finger to interact with the icons on the sidebar 444. The user may utilise other input means to interact with the icons on the side bar 444. This interaction may be a simple press or tap of the desired icon of the sidebar 444 while still performing a 'long press' on the content item, to perform the action associated with the icon pressed or tapped.

When performing a simple press or tap with the other hand or finger on the shortcut icons on the sidebar 444, it is the release of the other hand or finger that causes the associated action to begin. However, if the user pressing on the shortcut icon does not release the other hand or finger from the shortcut icon, a different behaviour may occur as shown in state 502. Here the user has pressed on location 520 of the screen which is where the 'delete' shortcut icon 480 is located. By pressing on this shortcut icon, either instantly or after a certain period of time, the 'delete' shortcut icon 480 may transform into the larger 'delete' shortcut icon 580. This transformation can be animated or instant, and results in an icon that provides the user with more information regarding the icon being pressed. This additional information may be in the form of a textual description of the action as shown by the 'Delete' text appearing on 580 or could be a more detailed icon or some other portrayal of information such as audible or tactile feedback. The additional information or description may project from the menu, individually. The shortcut icon 480 may be the only one displayed as a larger shortcut icon 580. The description may project or extend from the menu, and this may be projecting or extending from an edge of the display. User input may cause the description to move out from the menu, and another user input may cause the description to retract into the menu, until the description ceases to be displayed.

This transition to the larger icon 580 indicates to the user that releasing from the press on that icon will result in that action being performed. Should the user slide the finger to another shortcut icon, the larger shortcut icon 580 will return to its original smaller size 480 and the shortcut icon now being pressed will expand to the larger shortcut icon. So while the user uses the left hand to 'long press' on a content item 411, thus bringing up the sidebar 444, the user can use another hand or finger to slide over individual shortcut icons in the sidebar 444 to be provided with more information about the possible actions associated with each shortcut icon As long as the user does not release the other hand or finger while pressing on one of these shortcut icons, the action will not be performed. Instead, the user may release the other hand or finger on a point of the screen 204 where there is no shortcut icon and therefore no action associated with the shortcut icons is performed.

When performing this multitouch interaction, there is still the requirement of performing a 'long press' on the content item 411, which could mean subsequent multitouch interaction will take at least as long as the 'long press' to perform, resulting in a long delay between each action. To overcome this delay, after a user has performed a two-handed action, an 'accelerator' is provided to quickly perform actions repeatedly. The system may adapt to the frequency of the shortcut action usage such that the more the user uses shortcut actions, the quicker the shortcut menu will appear on the screen, enabling quicker interactions.

A further implementation may not even require the visible appearance of the sidebar 444 once the 'accelerator' is provided. As when performing repeated actions the physical position of the shortcut icon on the sidebar for a specific action may remain the same, therefore a user would already know where to tap with the other hand or finger and may therefore not need to wait for the sidebar 444 to have appeared or finished transitioning onto the screen.

Figure 6:
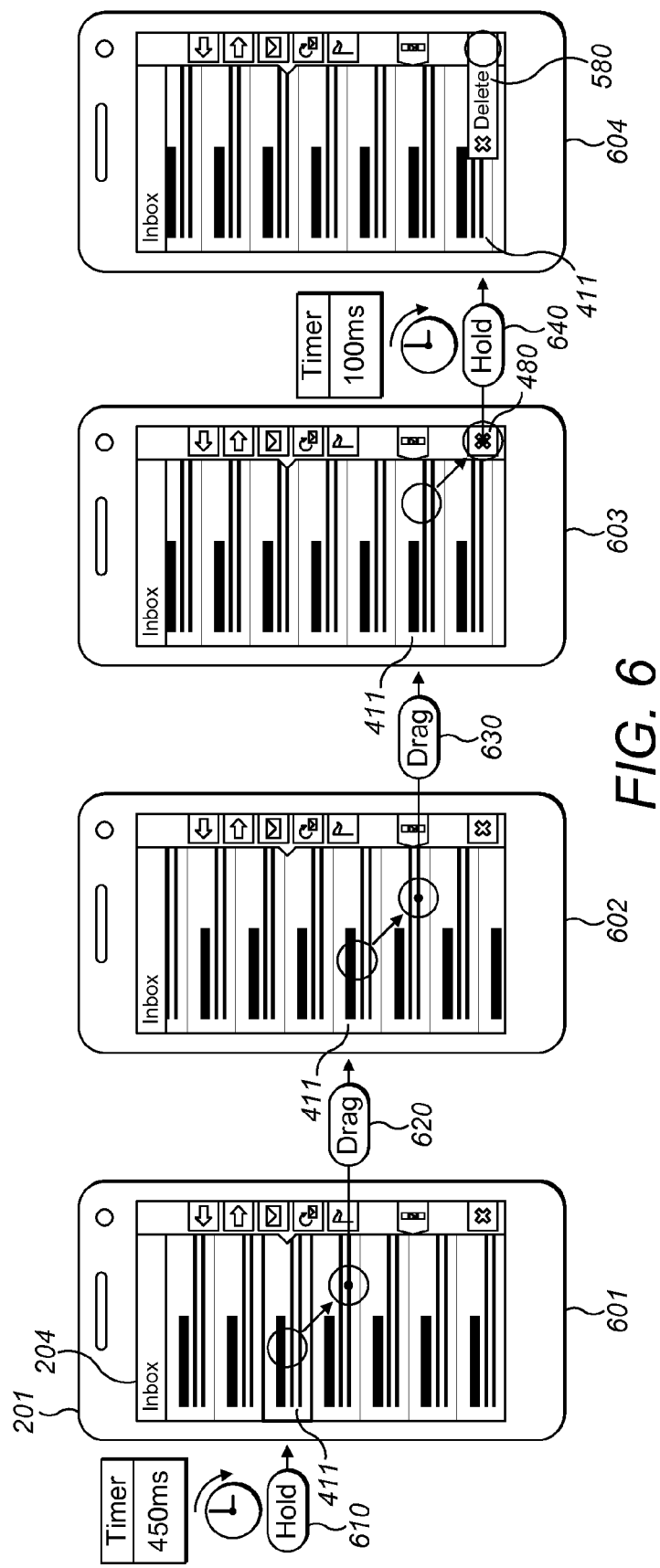
FIG. 6 illustrates an electronic device in accordance with an embodiment showing the use of a hold and drag gesture for interacting with a sidebar.

As shown in FIG. 4, the sidebar 444 may enter the screen after performing a 'long press' on a content item 411 which, in this example, is 450 ms. To initiate the sidebar faster for repeated actions, the previously described 'accelerator' can be utilised such that as an action is repeated, the time required before displaying the sidebar is reduced. A further mechanism for increasing the speed of user interaction is illustrated in FIG. 6. At state 601 the user has already performed a 'long press' 610 on content item 411, resulting in the sidebar 444 appearing. While the user is pressing on the content item 411, they can drag 620 the finger towards one of the shortcut icons on the sidebar 444.

At state 602 the user has dragged their finger closer to the 'delete' shortcut icon 480. The highlight effect on the marked content item 411 may be removed or faded away during this dragging. To provide feedback to the user, the screen 204 may display the content item as also moving with the drag, as indicated by the change in vertical position of content item 411 in state 602. This may therefore also result in the content list 410 itself scrolling with the dragging. This feedback may not be limited to a change in vertical position of the content item, but may instead show a change in horizontal position instead of or as well. References to 'lists' of content items need not be limited to lists arranged in one dimension, but can also be lists spanning multiple dimensions, such as grids of content items.

Alternatively, some other visual indication may be used, such as the movement of a semi-transparent visual copy of the content item 411 to coincide with the movement of the dragging motion 620. Should the user release the content item 411 before reaching the sidebar 444, the sidebar 444 may be dismissed and the user may return to the content list 410, or the sidebar 444 may become 'pinned' if the content item 411 has already been selected for a certain period of time before beginning the drag gesture.

Dragging 630 the content item 411 further may result in the user's finger pressing on one of the shortcut icons of the sidebar 444, as shown in state 603 where the user has now reached the 'delete' shortcut icon 480. On reaching the sidebar 444, the highlight around the selected content item 411 may return and non-affected content items may be dimmer. Releasing the user's finger at this stage over the 'delete' shortcut icon 480 would execute the delete action.

If the user held 640 their finger over one of the shortcut icons for a certain period of time, such as 100 ms, a further transition to state 604 may occur. Here the 'delete' shortcut icon 480 is unfolded, projected, extended or otherwise transformed to provide a larger shortcut icon 580, providing the user with the label of the action. Releasing the user's finger at this point would execute the delete action, but dragging the finger away from the sidebar 444, into the underlying application user interface and then releasing may dismiss the sidebar 444 or may result in it becoming 'pinned'. If instead the user drags their finger up and down the sidebar, a similar effect to FIG. 5 is achieved, where on holding the finger over each shortcut icon, the shortcut icons are transformed into larger shortcut icons to provide the user more information about the actions associated with the shortcut icons.

If at state 604, the user drags their finger from a shortcut icon and off the screen 204 itself onto the frame of the device 201 while the sidebar 444 is still being displayed, then no action may be performed. Instead, the sidebar 444 may remain on the screen and the user would have to perform a separate tap of the desired shortcut icon in order to perform the preferred associated action. This behaviour may be promoted to minimise the risk of accidentally triggering an action.

In the same way that the multitouch interaction of FIG. 5 can be modified to speed up actions with the sidebar 444 shortcut icons, the dragging interaction illustrated in FIG. 6 can also be used to speed up user interactions. At state 601, the content item 411 has already been 'long pressed' and therefore the sidebar 444 has already appeared. However, in this example the 'long press' requires 450 ms before the sidebar 444 appears. To remove the need for this delay, this dragging interaction may be adapted such that after a content item 411 has been 'marked' by a short press, which in this example requires 100 ms, the user may immediately start performing a dragging action to the location where the sidebar 444 usually is displayed. Although only a short press has been performed at this point and therefore the sidebar has not been displayed yet, by dragging the user's finger to the area where the sidebar 444 normally appears, the sidebar 444 may appear even before enough time has elapsed for a 'long press' to have occurred. By performing this dragging action, the sidebar 444 can therefore be manually invoked to allow for quick access to the shortcut icons available.

A further way of increasing the speed of interaction is to perform a short press on a content item such that a sidebar 444 has not been displayed yet, and then performing a concurrent touch, for example with another finger, on the area that the sidebar 444 will appear. This way the user does not have to wait for the sidebar to appear to perform the action and does not have to perform a drag action to cause the sidebar 444 to appear faster. A short press may result in the sidebar 444 being displayed, but on release of a short press the sidebar 444 may be dismissed, which would be different behaviour from a long press, where once a long press is released the sidebar 444 may be 'pinned'. In this alternative embodiment, performing a short press on the content item 411 does bring up the sidebar 444, so the concurrent touch can be performed in relation to a displayed sidebar 444.

Sidebar Expansion

The previous illustrative examples show a relatively small, unobtrusive sidebar 444 that contains a number of small shortcut icons and with various methods of expanding each individual shortcut icon to display a more detailed shortcut icon. While this emphasis on small unobtrusive icons is useful in cases where the meaning of the icons are intuitive or the user is already familiar with the icons and the actions they perform, in some instances, however, it may be desirable for the user to be able to see a more detailed version of all the icons, without having to individually interact with each one to do so. Therefore, FIG. 7 illustrates how the original sidebar 444 can be extracted to form a larger, more detailed sidebar 744.

Figure 7:
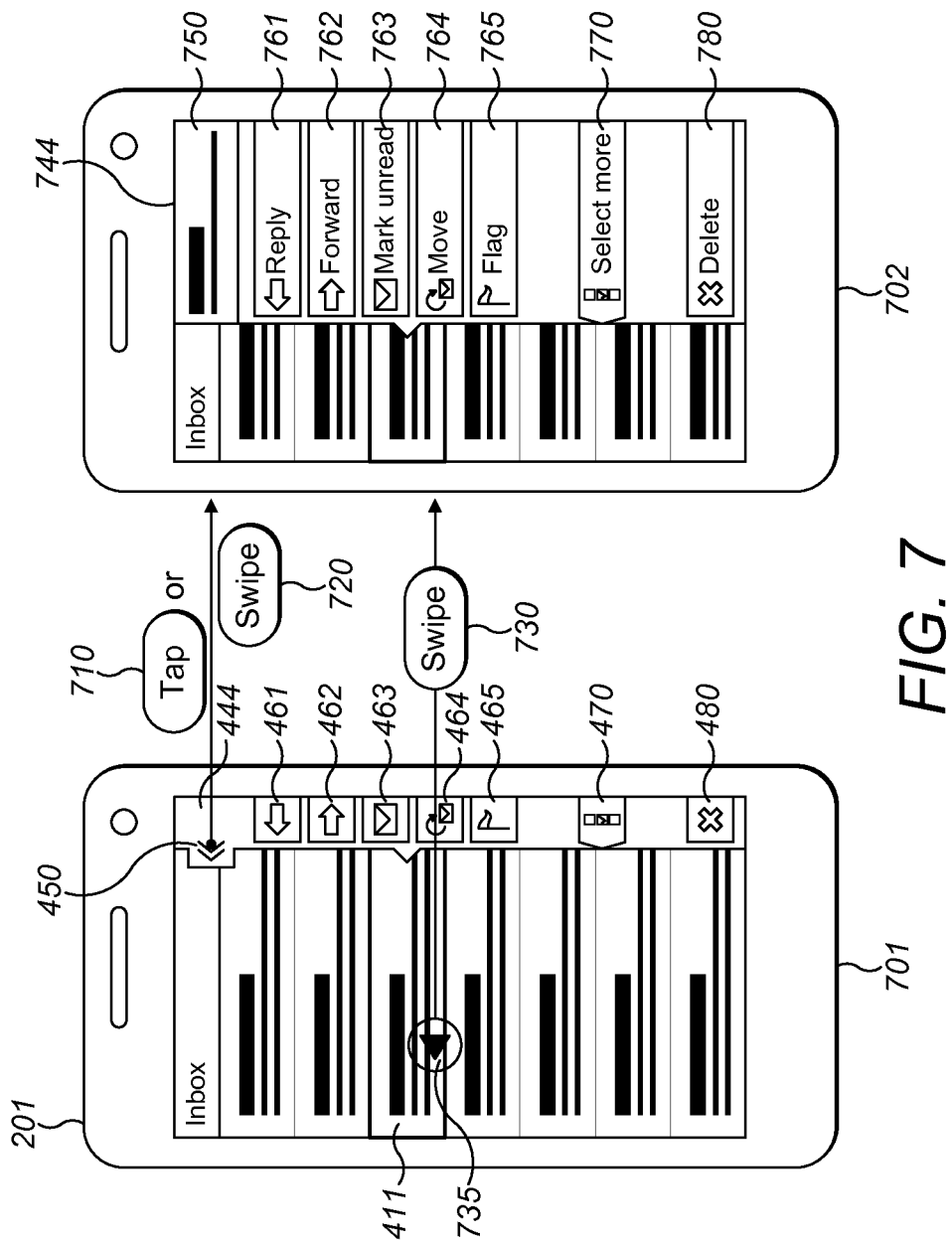
FIG. 7 illustrates an electronic device in accordance with an embodiment showing a number of user inputs for extracting a sidebar.

State 701 of FIG. 7 shows the same state that can be reached though 'pinning' the sidebar 444 in FIG. 4. From this 'pinned' state 701, there are a number of possible gestures that can be performed to reach the fully extracted sidebar menu 744. The extraction shortcut icon 450 may be tapped 710 or swiped 720 to cause the small sidebar 444 to transform to the larger expanded sidebar 744 in state 702. In this expanded sidebar 744, more detail may be provided to some or all of the shortcut icons, such as by providing a textual label indicating the associated action or by providing a more detailed icon. We can see that the small graphical icons of 461 to 465 have been transformed to the larger shortcuts with labels in 761 to 765 respectively. The 'select more' 470 and 'delete' 480 shortcut icons have also been expanded to the larger icons 770 and 780.

The transition from small sidebar 444 to expanded sidebar 744 may be instantaneous or through a transitional animation, such as a translational movement further into the display 204. A header 750 may also be included in the expanded sidebar 744, which could provide more information about the selected content item 411.

Another way of expanding the sidebar 444 may involve the user swiping 730 anywhere on the screen 204 to extract the full sidebar 744 as illustrated by placing the user's finger on point 735 and swiping 730 to the left.

Once the extracted sidebar 744 has been extracted, it may be beneficial to disable certain gestures to prevent any unintended actions such as the Bezel-side-swipe gesture that can be used for swiping to next or previous pages or applications. It may also be beneficial to prevent unintended actions such as the Bezel-side-swipe gesture even before the sidebar 744 has been extracted, such as when the user has performed a short press on a content item.

One way of dismissing the fully extracted sidebar 744 is for the user to provide a user input in relation to a part of the screen not associated with the sidebar 744. For example, the user could perform a tap gesture on the underlying user interface to cause the extracted sidebar 744 to be removed completely, either immediately or with a transitional effect like an animation. There may be a separate gesture for returning the sidebar 744 to a non-expanded state 444, such as swiping to the right. Dismissing the pinned sidebar 444 may be achieved by performing a gesture like tapping an area of the underlying user interface.

If a user has just performed a 'long press' on a content item 411 but has not yet released their finger, the sidebar 444 will be displayed but may not be in a pinned state. Therefore a further option may be available to dismiss the sidebar 444, such as by dragging the user's finger away from the point of initiation and releasing their finger Once a user has selected a shortcut icon on the enlarged sidebar 744, the action may be performed and the sidebar 744 may automatically be dismissed as once the action has been performed the sidebar 744 may no longer required. When selecting one of the enlarged shortcut icons, for example the enlarged 'mark unread' icon 763, an indication may be provided to the user to show that that icon has been selected. This indication may be a visual indication like highlighting the icon, or it could be some other indication such as an audible indication or localised haptic feedback.

The visual indication may be provided in the way in which the sidebar 744 is dismissed once the icon has been selected. One way of providing this indication is to animate the components of the extended sidebar 744 as they are being dismissed, but providing a different animation to the selected icon. For example, the animation for dismissing the selected icon may be delayed or performed at a different speed compared to the animation for the dismissal of the other components of the extended sidebar 744. Such an animation may be a simple transverse movement off the screen, such as a slide to the right. By introducing a delay or reducing the speed of the animation related to the selected icon means that it can be displayed on the screen 204 for longer, therefore giving a user a chance to see what icon they have selected rather than it quickly being dismissed like the other components of the sidebar, which are dismissed promptly so as to free up screen space. This indication may not be limited to the extended sidebar 744, but may also be provided to the user when they select an icon on the normal sidebar 444.

Undo Operation

Figure 8:
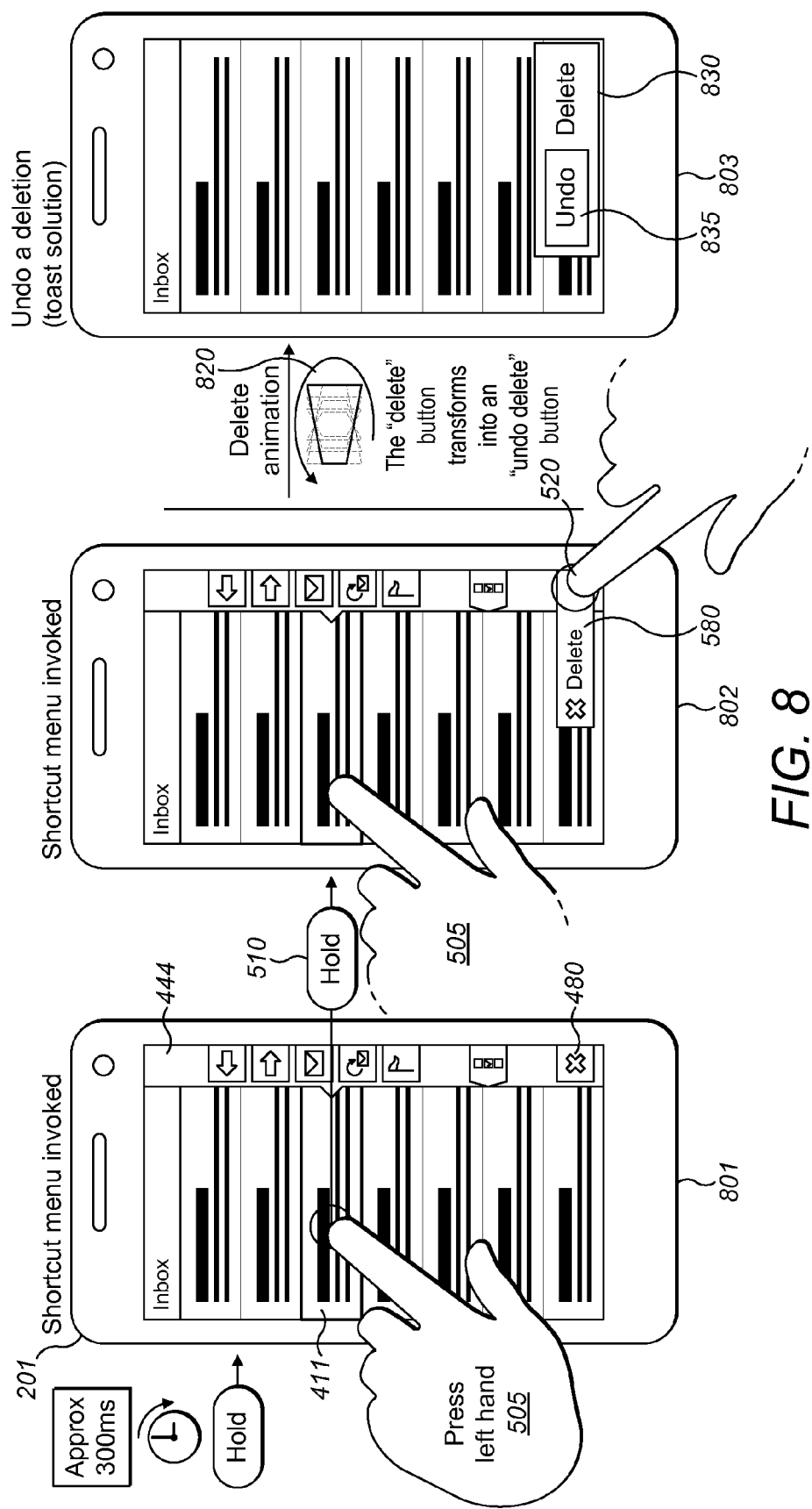
FIG. 8 illustrates an electronic device in accordance with an embodiment showing the operation of a user interface including the introduction of an 'undo' option after a user has selected a 'delete' operation.

Referring now to FIG. 8, states 801 and 802 show the same multitouch actions as those performed in states 501 and 502 of FIG. 5 where, after a content item 411 is marked, the user applies an action by pressing and releasing one of the shortcut icons on the sidebar 444. The example illustrated in FIG. 8 shows a proposed 'undo' solution for this user interface. In this example, the 'undo' solution is in reference to undoing a delete operation, but could be applied to other actions performed from within the user interface.

When a user input to delete a content item 411 is received, like tapping on the delete shortcut icon 580, there is a transition to state 803. On initiating the delete action, the content item 411 may be removed from the content list 410 and the data itself may be removed from the memory entirely. The sidebar 444 may also be dismissed by carrying out the deletion action and a deletion animation may take place indicating the content item 411 is being deleted. In this embodiment, once the deletion has occurred, an 'undo' option is provided to the user to cover the situation where the deletion was by accident or the user changed their mind. This 'undo' option may be in the form of an undo button 835 contained within an 'undo' container (or 'widget', which is a generic term for an element of a GUI) 830 or simply an undo button 835 on its own.

The 'undo' option may be provided as some transition from the selected menu item itself to make it clear that the 'undo' option that has appeared will undo the action that has just been initiated. For example once the delete button 580 is selected, it may transform into an 'undo delete' button 830. This transformation could be a rotation animation 820 like the one illustrated, where the delete button 580 rotates around an axis to turn into the 'undo delete' container 830.

This undo button 835 may remain on the screen until the user selects the undo option, therefore reversing the action. The undo option 830 may also be dismissed when the user interacts with another location of the display 204, hence indicating that the user is not interested in the undo option, thereby freeing that part of the screen again. The undo option 830 may remain on the screen even after the user has begun interacting with the underlying screen and may only disappear after a minimum amount of time after the interaction has started.

The proposed undo solution allows for a faster completion of actions, as confirmation is not required, while still allowing for easy correction if the user carried out the action by mistake or has since changed their mind. The proposed undo solution does not steal focus and is unobtrusive as it will naturally disappear when it is clear that the user does not wish to carry out an undo command.

Multiple Content Types

Selecting content items from a content item list 410 may result in a sidebar 444 appearing where there are icons relating to actions that can be performed on the content item. In the illustrative examples presented thus far, the content items selected have been email messages and, therefore, the icons in the sidebar 444 have related to actions that can be performed on email messages (such as reply and forward). However, it is possible for selected content items to hold data or have links to multiple content types. For example, an email message can be considered an 'email message' content type, however it also contains data such as contact details of the person who sent the message. A user who selects the 'email message' may wish to perform actions related to the contact details of the person who sent that email message and would therefore want actions related to a 'contact' content type (such as 'call', 'send SMS' or 'view contact details'). Therefore, a solution is provided for dealing with content items that contain multiple content types and would therefore require different shortcut menu items based on the desired context.

Figure 9:
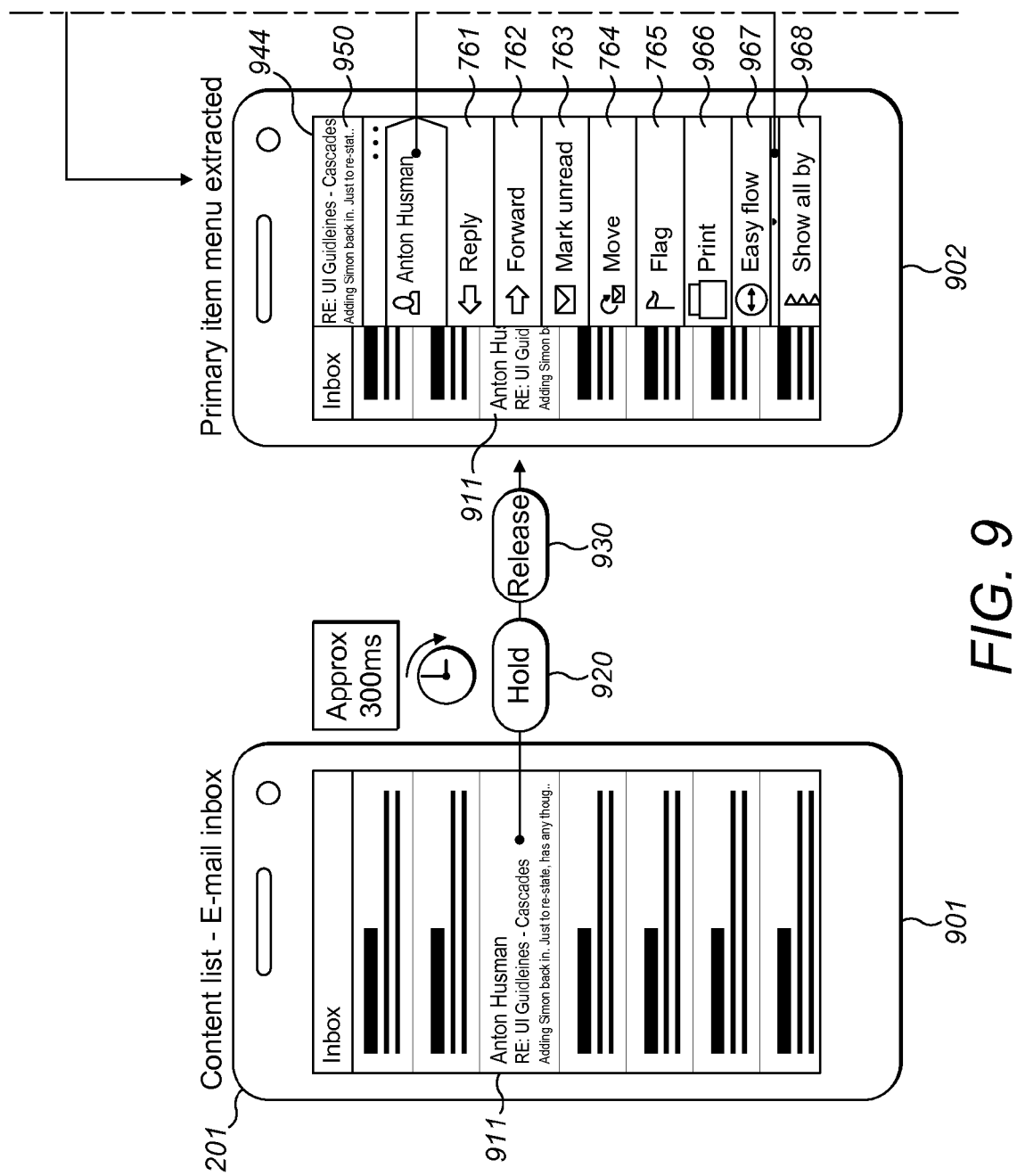
FIG. 9 illustrates an electronic device in accordance with an embodiment showing the initiation of separate content item menus related to different content types.
Figure 9:
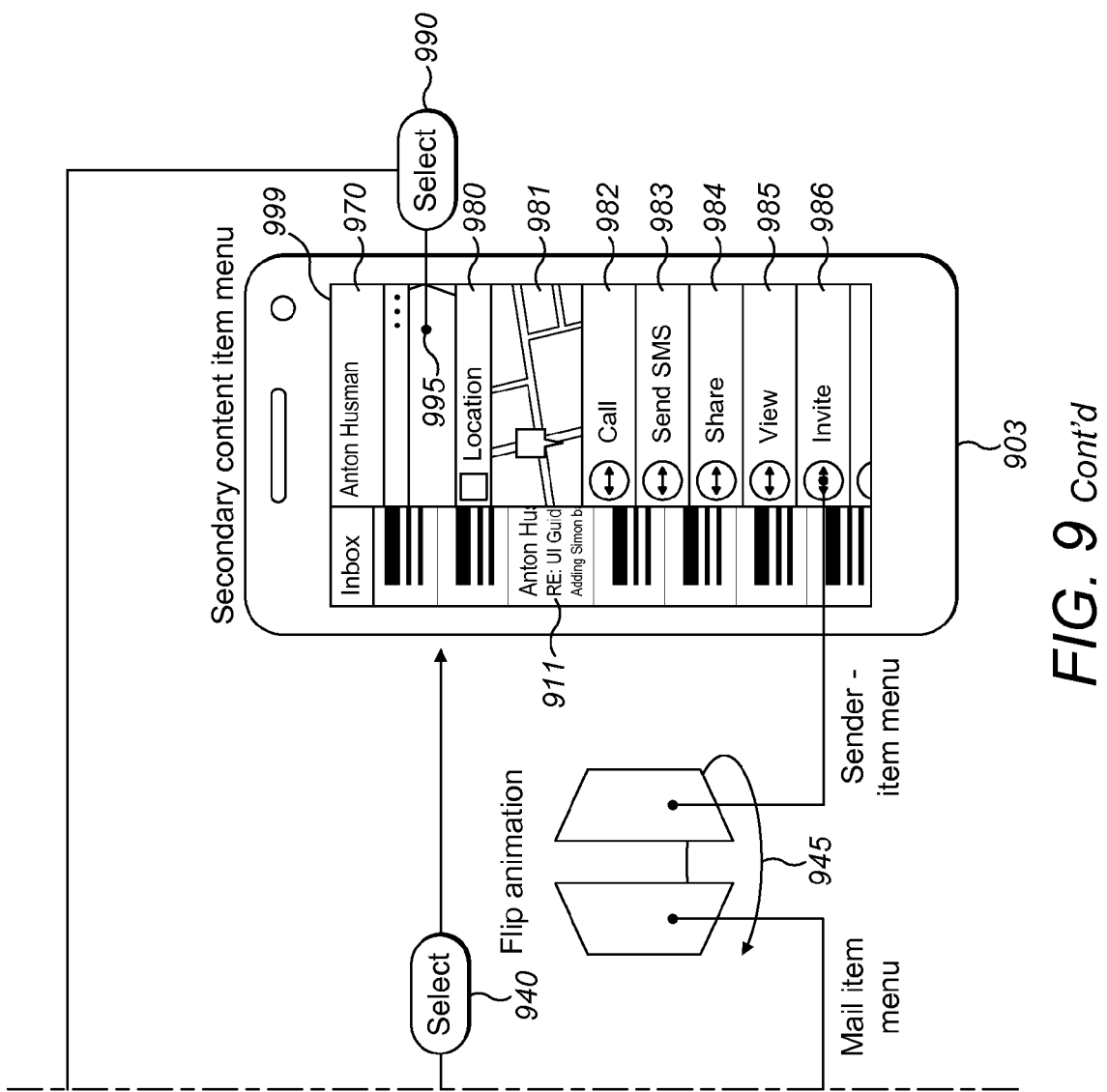

FIG. 9 illustrates a proposed solution for managing content items with multiple content types. State 901 shows an email application with a numbers of email message content items, with one content item 911 that the user wishes to interact with. The user can perform a 'long press' 920 and release 930 the content item 911 to summon a pinned sidebar 944. The pinned sidebar 944 may already be in the extracted state as shown in state 902 or may need to be expanded out by a swipe command (not shown) as described in FIG. 7.

The sidebar 944 shown in state 902 displays actions related to the content item in the context of an email message and therefore displays shortcuts related to actions that can be performed on the selected email message (such as 'reply' 761, 'forward' 762, 'print' 966, 'easy flow' 967 and 'show all by' 968). The header 950 of the extracted sidebar 944 displays information about the email message, showing that the sidebar 944 is in a state related to email message actions.

On receipt of a user input, such as selecting 940 an element of the sidebar 944, the state may change to 903 where the email message related sidebar 944 changes to a contact-related sidebar 999, displaying shortcuts to actions associated with the contact content type. The change from one sidebar context to another sidebar context may happen instantly or through a transition such as an animation. One proposed transition is a flip animation 945, where the email message-related sidebar 944 appears to flip over to reveal the contact-related sidebar 999.

In this illustrative example, the contact-related sidebar 999 now displays the contact name as the header 970, rather than the email message details, and it now displays icons relating to actions that can be performed on the contact content type (like call 982, send SMS 983, share 984, view 985 and invite 986). These actions may be performed within the email application itself, or can be performed by a separate application designed for dealing with contact-related actions, such as the contacts application.

The example of a content item with message and contact content types associated with it has been discussed, but there are many other examples that could exist, such as a message content item containing data related to an attachment, or a calendar invite content item linked to supplementary data like attachment or contact content types. Furthermore, a content item may have more than two content types, in which case there may be more than two context-sensitive sidebars that the user can switch between. For example, a calendar invite may have three content types; a first for the calendar invite itself, a second for contacts (or invitees) in the calendar invite and a third for attachments in the calendar invite. An example of where more than three content types may be related to a single content item could be a music track content item which could have information relating to a music album as well as being linked with data relating to the music artist. The artist-related sidebar could include options like performing a web-search related to the artist, or looking for other music by the artist or finding pictures of the artist, the album-related sidebar may contain options such as 'add album to playlist' or 'change metadata', and the track-related sidebar may have options like 'play' or 'pause'.

In addition to icons relating to actions that can be performed on the content item, more advanced elements can also be displayed in the sidebar 999. For example, beneath the location 980 header and icon is information regarding the location of the contact represented graphically on a map 981. It may also be possible to interact with the map, such as by zooming out or shifting the view or simply opening a larger map by selecting the map. While most of the example sidebars presented thus far have mostly shown a list of actions that can be performed on the content item, it is possible for advanced functionality like displaying static or interactive media related to the content item in the sidebars 744, 944 or 999.

Certain functionality or information may also be provided to the user that may otherwise not be available from within the underlying application itself. Such functionality or information may be available in the form of graphical user interface elements also referred to as 'fragments'. Fragments represent a portion of an application that can be temporarily obtained while still in an underlying application. These fragments may be considered as a portal into another application and allow other applications to provide functionality or information to the underlying application, without requiring the user to leave the underlying application. The location map 981 may be an example of such a fragment, if the map functionality is not available from with the underlying application itself, but a separate map application. Other examples of fragments could include music player controls, weather information, clocks, social media information or functions, and third party services. The fragments provide an interface into another application, and the user can interact and operate the other application from the menu without requiring navigation or launch of the other application. User interaction with the fragment may cause additional actions to be performed and additional information to be displayed. For example, if the menu is displaying a map showing the location of a contact, the display may provide options for actions which can be initiated from the fragment. An example might be to providing directions to the address of the location of the contact. The directions may be provided in the menu or in an overlay of the graphical user interface. In another example, the user interaction with the fragment may cause a change to the other application. For example, if the fragment is an interface to a social media application associated with either the user or the contact or both the user and the contact, the interface may allow for a message to be entered into the fragment and that message may be sent to the social media application which in turn updates the user's, the contact's or both the user and contact's accounts. In a more specific example, the fragment may show a recent posting or status update of a contact, and provide the ability for the user to comment or respond in some manner to the posting or status update, without requiring the user to launch the associated application.

To return to the original sidebar 944 or even to switch to a further sidebar state related to a different content item type, the user can select 990 a region of the screen 995 to initiate a change of sidebar state.

By providing separate, interchangeable context states for the sidebars depending on content type, an intuitive, cleaner user interface is provided that allows users to perform a multitude of actions without cluttering the display 204 with a multitude of unrelated icons and without necessarily having to leave the application to initiate actions from an application better suited for the content type in question.

Multiple Select

As mentioned before, one of the shortcut icons that may be available on the sidebar 444 is the 'select more' or 'multiple select' 470 icon. Selecting this icon can enable a 'multiple select' mode, thus allowing for easier and more intuitive methods of selecting multiple content items.

Figure 10:
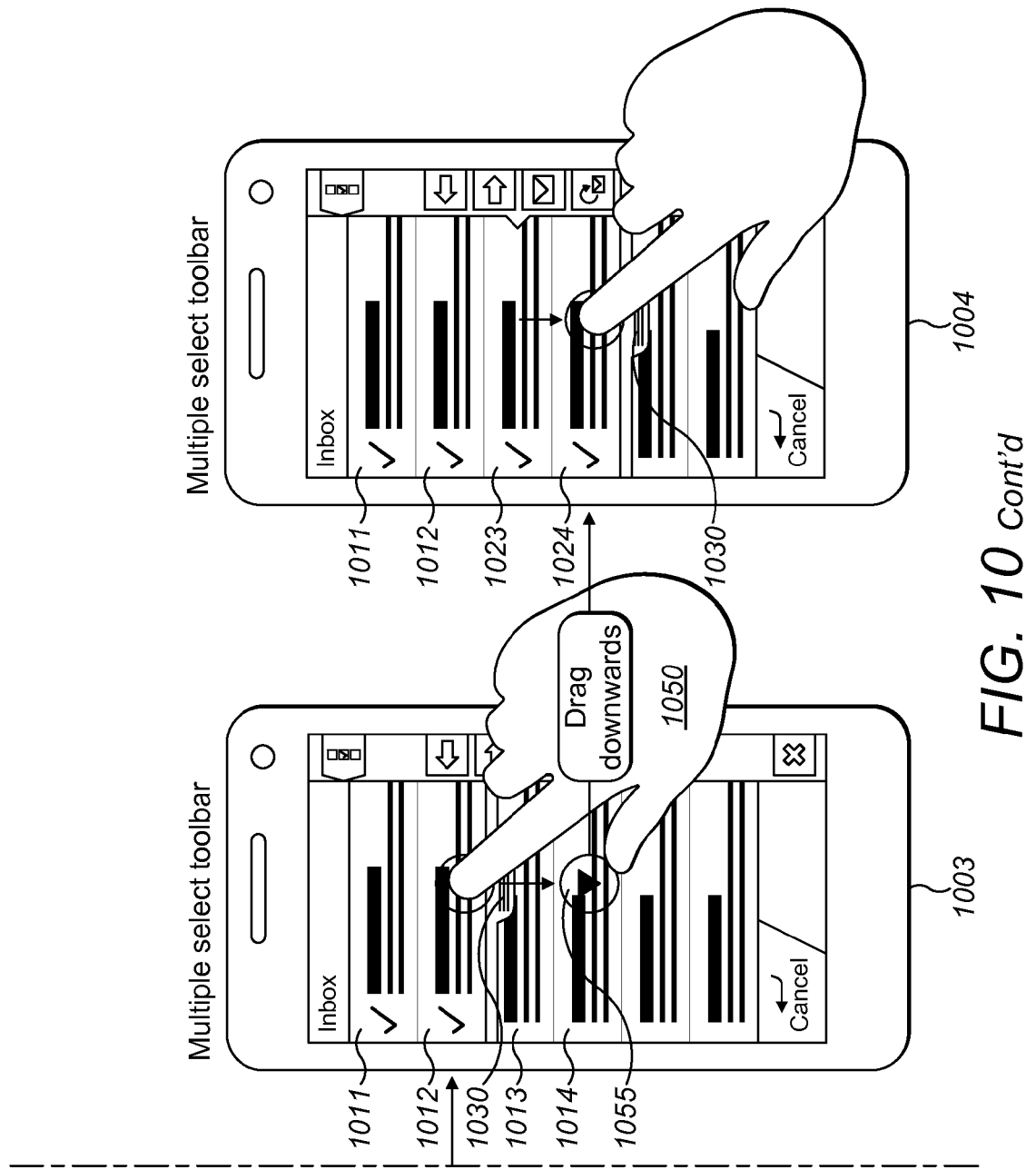
FIG. 10 illustrates an electronic device in accordance with an embodiment showing a method of selecting multiple content items in a user interface.

FIG. 10 illustrates one proposed method of performing multiple selections. At state 1001, the user has already initiated the multiple select mode. In multiple select mode, the positioning of the 'multiple select' icon 470 may change on the sidebar 1044 so that it is at the top to indicate that 'multiple select' mode is activated. Furthermore, in multiple select mode, a cancel icon 1015 may be available for exiting multiple select mode and this cancel icon may either be on the sidebar 1044 or in its own bar 1020.

At state 1001, the user has already selected two content items 1011 and 1012, and this selection may be indicated to the user by a graphical means, such as tick marks overlaying the content items and/or highlighting the selected items and/ or greying out non-selected items. There may also be some indication of the number of items already selected or the type of items selected, like in the cancel bar 1020.

If the user wishes to expand the selection, one option available may be to provide some user input to trigger a selection expansion mode, such as by pressing a specific button on the sidebar 1044 or by pressing 1025 on one of the content items 1012 at the extremity of the list of selected items and holding that press 1020 for a predetermined amount of time (about 200 ms in this illustrative example). On completing this long hold, the state may change to 1002 where some indication of a selection expansion mode is shown, such as the selection handle 1030. The user can hold 1040 their finger on the last item of the selection as shown in state 1003, and drag 1050 it down to expand the selection. By dragging the user's finger down to a different area of the screen 1055, previously unselected content items 1013 and 1014 may be selected, as indicated in state 1004 where items 1011, 1012, 1023 and 1024 are selected content items. This expansion of the selection may also occur by holding on the first item in the selection and dragging upward. Similarly the selection may also be reduced by dragging the user's finger into the selection, for example by dragging upwards rather than downwards in state 1003 of FIG. 10.

Figure 11:
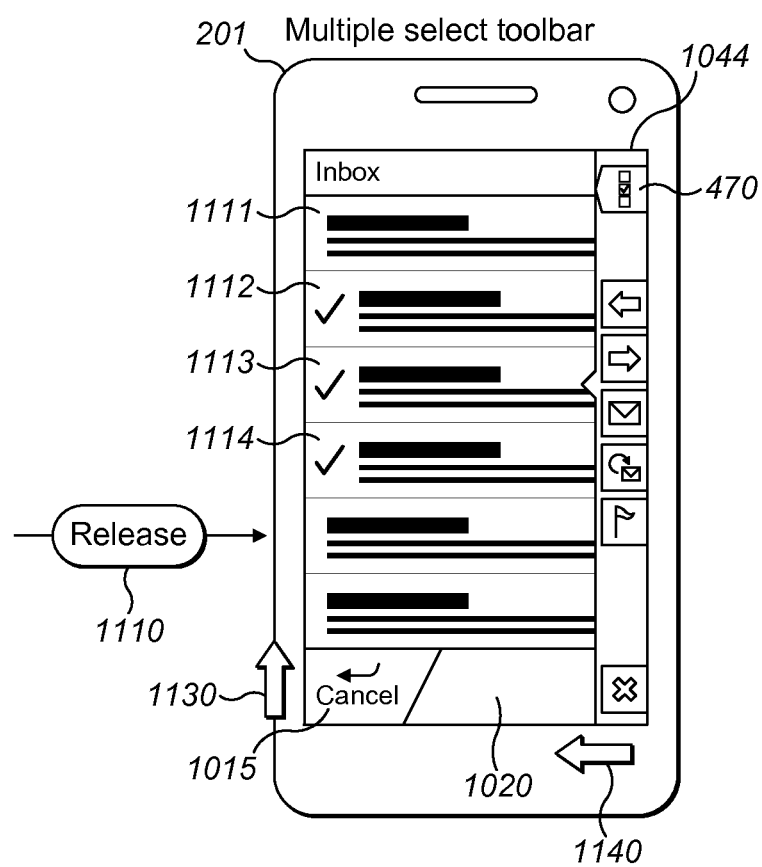
FIG. 11 illustrates an electronic device in accordance with an embodiment showing a multiple select toolbar within a user interface.

Another way of selecting multiple content items is discussed in relation to FIG. 11. In a state where the sidebar is not initiated and the user is faced with a collection of content items 410, the user may use multitouch gestures to initiate multiple select mode. Such a multitouch gesture could include placing two fingers at either extremity of the list of content items that the user wishes to select. FIG. 11 shows a possible consequence of pressing one finger on content item 1112 and the other at content item 1114, holding for a certain length of time and then releasing 1110. Performing this action selects the two content items touched and all the content items in between and may initiate multiple select mode by causing the multiple select sidebar 1044 and cancel bar 1020 to be displayed. These bars may be introduced instantly or through an animated transition like a slide in as shown by movement arrows 1140 for the sidebar 1044 and 1130 for cancel bar 1020. The sidebar 1044 may display the icons only relating to actions that can be successfully performed on all the content items selected, or it may display only a subset of these icons or it may display icons for actions that can only be performed on some of the content items, but not necessarily all.

While in multiple select mode, the user can also add content items to their selection that are not currently visible on the screen. For example, when using the expansion handle 1030 of FIG. 10, while the user is dragging their finger to select additional items, once the user reaches the end of the visible screen or window, an automatic scroll could initiate to continue selecting in the direction of the dragging. When in multiple select mode, and the expansion handle 1030 is not activated, a user could simply scroll through the content as normal and single tap or hold the individual content items, or groups of items to add or remove them from the selection. This is possible even when scrolling away from a view of the currently selected content items, without losing those selections. Once the user has completed their selection they can perform one of the actions in the sidebar 1044 or cancel the selection and return to the underlying user interface.

Realignment of Content

Figure 12:
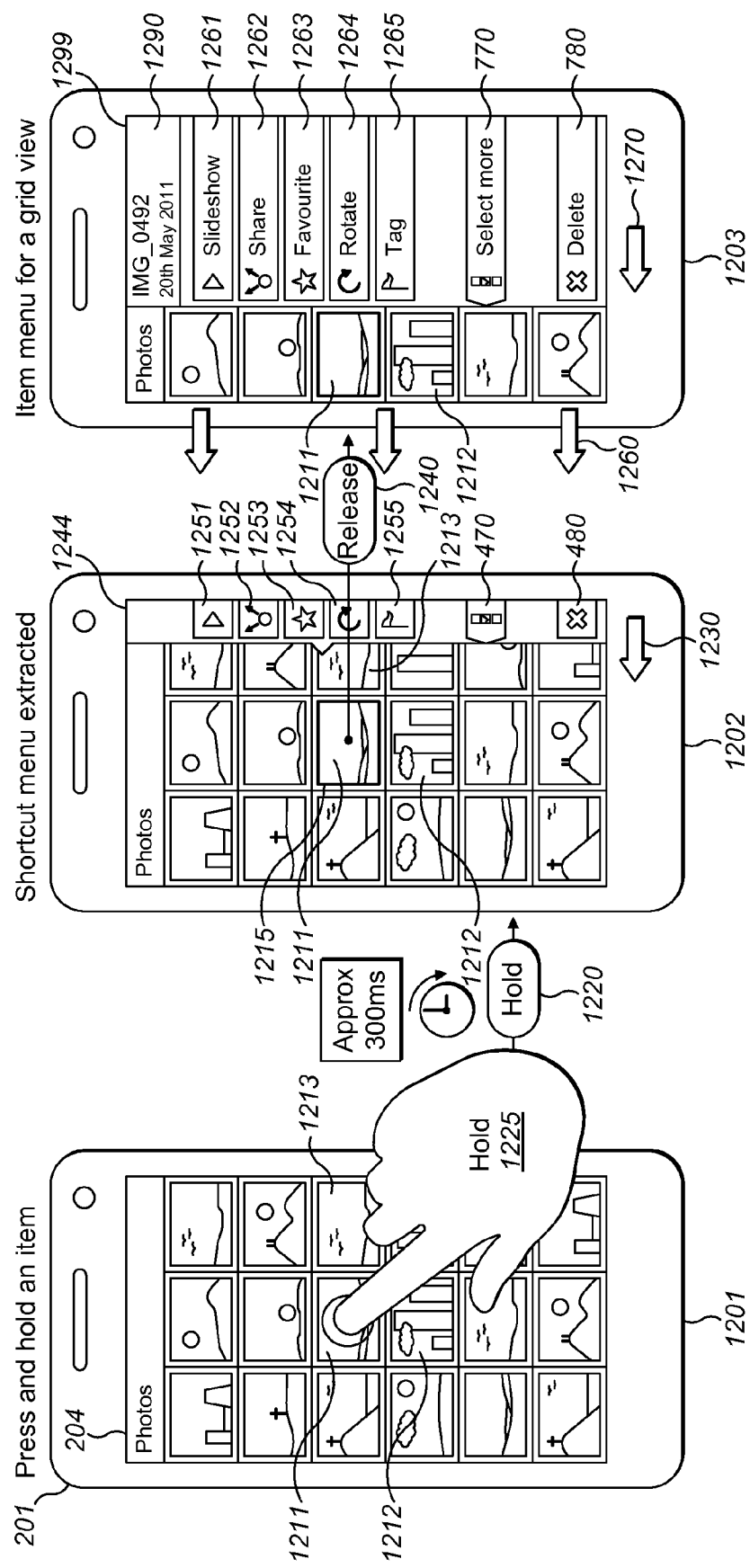
FIG. 12 illustrates an electronic device in accordance with an embodiment showing the extension of a sidebar and the resulting impact on the displayed content.

When a sidebar 444 or expanded sidebar 744 appears over the underlying user interface, it is possible that the sidebars might cover and therefore obscure the view of the selected content item or items. FIG. 12 illustrates how a proposed solution for ensuring that selected content remains visible or at least partially visible even when a sidebar appears.

State 1201 shows an image or photo viewing program with an arrangement of images laid out in a grid. The layout need not be a grid, it could be a linear list like with the example email application, or it could be an entirely unorganised combination of content items without any apparent structure. A user chooses to select content item 1211 by placing their finger 1225 over the content item 1211 and holding down 1220 for a certain amount of time (300ms in this example). Like in FIG. 4, performing a 'long press' on a content item selects it (as indicated by the highlighted border 1215) and causes a transition to state 1202 where sidebar 1244 is brought in 1230 to display a number of shortcut icons associated with the actions that can be performed on the content item selected. Such actions may include starting a slideshow 1251, sharing the content 1252, adding the content to the user's favourites 1253, rotating the image 1254 and tagging the image 1255.

Already, image 1213 is being obscured by the sidebar 1244 as it was once clearly visible in state 1201. However, as the selected content item is still clearly visible, there may not be a need to adjust the view of the underlying user interface.

Once the user releases 1240 their finger, the sidebar 1244 may become pinned, at which point the user may choose to expand the sidebar 1244 to get more information about the available actions. By performing a swipe to the left (not shown), the sidebar 1244 is expanded the larger sidebar 1299 by a movement to the left 1270. In this expanded sidebar 1299, there is displayed a header 1290 providing information about the image, and each of the icons 1251 to 1255 have now expanded to larger icons 1261 to 1265 to provide more information regarding their respective functions.

Such an expansion of the sidebar 1244, however, would likely obscure the view of the selected content item 1211. Therefore, as shown in state 1203, when the sidebar 1244 expands to the left 1270, the underlying user interface also expands to the left 1260, to ensure that the selected content item 1211 is at least partially visible.

There are a number of ways to minimise or reduce how much an expanded sidebar 1244 obscures selected content items. One, as shown above is, is to translate 1260 the entire underlying user interface in the same direction as the sidebar expands (as illustrated by the relocation of both content items 1211 and 1212). Another way is to rearrange the content items such that the selected content item(s) are displayed in the remaining space that is not obscured by the sidebar 1244. This would be especially useful when multiple items are selected, as if content items 1211 and 1213 had been selected, no amount of simple translations would have allowed other images 1211 and 1213 to be visible, but instead rearranging the grid so that image 1213 is located under 1211 would allow them both to be displayed. A further way, could be to perform a resizing transform on some or all of the content items or GUI, while either maintaining the aspect ratios or not. The transparency of the sidebar can be altered to ensure that the underlying content is at least partially visible. Resizing the content items or GUI may result in none of the underlying content to be obscured by expanded or non-expanded sidebar.

Once a sidebar has been expanded there will only be a finite amount of space left in the underlying application to display content without being obstructed by the sidebar 1244. This space, referred to as 'content area', might have one or more dimensions smaller than the size of the content item or items selected, in which case the content item may be aligned in a specific way, such as to the side of the content area opposite to the sidebar, to ensure maximum visibility of the content item. If the content item is smaller than the content area, then the content item may be placed in a certain alignment, such as the centre of this content area, to ensure it is displayed in the most clearly visible region of the content area. Should the content item by smaller than the content area, but be positioned close to the sidebar 1244, it may be preferable for it to align with the side adjacent to the sidebar 1244 rather than with the centre of the content area to maximise visibility, while still minimising the change in position of the content item. These solutions could also be applied for when non-expanded sidebars are likely to obscure content once they appear.

The above proposed solutions allow a full-functioned user interface to be provided that minimises the amount of screen real estate used and aims to minimise how much the actual content is obscured by its presence.

It is to be understood that the present disclosure includes all permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

Embodiments have been described herein by way of example and these embodiments are not intended to be limiting. Rather, it is contemplated that some embodiments may be subject to variation or modification without departing from the spirit and scope of the described embodiments.

Further exemplary embodiments of the present disclosure will now be set out in the following numbered clauses.

Numbered clause 1. An electronic device for providing users of the device with access to content, comprising:
a touch-sensitive display for receiving user input;
one or more processors; and
memory comprising instructions which when executed by one or more of the processors cause the electronic device to:
display on the display, in juxtaposition with the graphical user interface of an application, a sidebar representing a shortcut menu, the sidebar containing one or more icons representing operational shortcuts selectable by the user to cause respective operations to be performed in relation to the one or more content items;
the memory further comprising instructions that, in response to detection of a press on an operational shortcut icon, cause the device to display an enlarged operational shortcut icon projecting from the sidebar representing the respective operation in place of the pressed operational shortcut icon.

Numbered clause 2. An electronic device as claimed in clause 1, said memory comprising instructions which when executed by one or more of the processors cause the electronic device, in response to receipt of a user input representing a non-modal shortcut menu-summoning operation performed in relation to one or more selectable content items represented in a graphical user interface of an application displayed on the display, to:
display on the display said sidebar; and
permit the user to continue to interact with at least part of the graphical user interface of said application while the sidebar is displayed on the display.

Numbered clause 3. An electronic device as claimed in clause 1 or 2, said memory further comprising instructions which when executed by one or more of the processors cause the electronic device, in response to receipt of a user input representing a modal shortcut menu-summoning operation performed in relation to one or more selectable content items represented in a graphical user interface of an application displayed on the display, to:
display said sidebar on said display; and
cease displaying said sidebar in response to receipt of a user input representing a shortcut menu-dismissing operation, such that the user is thereafter able to continue to interact with the graphical user interface of said application.

Numbered clause 4. An electronic device as claimed in clause 3, wherein the user input representing a modal shortcut menu-summoning operation is a static long press gesture on the content item for a period exceeding a long press threshold time value.

Numbered clause 5. An electronic device as claimed in clause 4, wherein the long press threshold time value is varied dependent on monitored frequency of use of said gesture.

Numbered clause 6. An electronic device as claimed in clause 4 or 5, wherein the memory further comprises instructions such that, if the user releases the static long press gesture without beforehand dragging on the touch-sensitive display, the sidebar is pinned to an edge of a useable area of the display such that it continues to be displayed after the static long press gesture is released.

Numbered clause 7. An electronic device as claimed in clause 4, 5 or 6, wherein, where said user has not yet released said static long press gesture, said user input representing a shortcut menu-dismissing operation is a drag continuing from said static long press and a subsequent release of said drag on an area of the touch-sensitive display off the sidebar.

Numbered clause 8. An electronic device as claimed in any of clauses 4 to 7, wherein, where said user has already released said static long press gesture without beforehand dragging on the touch-sensitive display, said user input representing a shortcut menu-dismissing operation is a tap on an area of the touch-sensitive display off the sidebar.

Numbered clause 9. An electronic device as claimed in clause 8, wherein said user input representing a non-modal shortcut menu-summoning operation is one or more of:
a static short press gesture on a content item for a period exceeding a short press threshold time value followed by a drag in the direction of the location of the shortcut menu; and
a static short press gesture item for a period exceeding a short press threshold time value on a content item followed by a concurrent touch on the display where the shortcut menu will appear.

Numbered clause 10. An electronic device as claimed in clause 9, the memory further comprising instructions to cease displaying the sidebar if said touch continued from said static short press gesture is released.

Numbered clause 11. An electronic device as claimed in clause 10, wherein said act of ceasing to display the sidebar is only carried out if no user input representing an interaction with said sidebar is received.

Numbered clause 12. An electronic device as claimed in any preceding clause, the memory further comprising instructions to cease displaying the sidebar as a result of a user selecting an operational shortcut icon in the sidebar.

Numbered clause 13. An electronic device as claimed in any preceding clause when dependent on clause 2, wherein said user input representing a non-modal shortcut menu-summoning operation performed in relation to the one or more content items displayed in the graphical user interface of an application also causes a selection of said one or more content items.

Numbered clause 14. An electronic device as claimed in any preceding clause when dependent on clause 3, wherein said user input representing a modal shortcut menu-summoning operation performed in relation to the one or more content items displayed in the graphical user interface of an application also causes a selection of said one or more content items.

Numbered clause 15. An electronic device as claimed in any preceding clause, wherein said device is a portable electronic device.

Numbered clause 16. An electronic device as claimed in any preceding clause, wherein the instructions further cause the device, when the graphical user interface of the application displays a list of content items and the device receives user input in the form of a long press on a first content item, to display in relation to the selected first content item a graphical user interface widget representing a selection handle, the selection handle widget being draggable by a user to select one or more additional content items adjacent the first content item in the list.

Numbered clause 17. An electronic device as claimed in any preceding clause, wherein the instructions further cause the device, in response to receiving user input indicative of a multiple-select operation, to allow a user to select/unselect plural content items presented in the graphical user interface of the application by touching on said content items.

Numbered clause 18. An electronic device as claimed in clause 17, wherein said user input indicative of a multiple-select operation is a touch on a multiple-select operation icon.

Numbered clause 19. An electronic device as claimed in any preceding clause, wherein the instructions configure the device to attempt to perform the respective operations on the selected one or more content items indicated by each operational shortcut icon in response to receipt of user input representing an operational shortcut-activating operation.

Numbered clause 20. An electronic device as claimed in clause 19, wherein said user input representing an operational shortcut-activating operation is a release of a touch on said icon.

Numbered clause 21. An electronic device as claimed in any preceding clause, wherein the instructions further cause the device, in response to receiving user input indicative of a delete operation in relation to a selected content item, to display a graphical user interface undo delete widget usable by a user of said device to undo a deletion of said content item.

Numbered clause 22. An electronic device as claimed in clause 21, wherein the undo delete widget continues to be displayed until the expiry of a persistence time period which commences once the user starts to interact with the user interface.

Numbered clause 23. An electronic device as claimed in clause 21 or 22, wherein in response to receiving user input indicative of a delete operation in relation to a selected content item the representation of the selected content item in the user interface is altered to indicate its deletion.

Numbered clause 24. An electronic device as claimed in clause 21, 22 or 23, wherein, in response to receiving user input in relation to said undo delete widget, said selected content item thereafter continues to be represented in said graphical user interface and said content item is retained.

Numbered clause 25. An electronic device as claimed in any of clauses 21 to 24, wherein said user input indicative of a delete operation in relation to a selected content item comprises a release of a touch on a delete shortcut icon provided on said sidebar.

Numbered clause 26. An electronic device as claimed in clause 25, wherein, after receiving said user input indicative of a delete operation, said delete shortcut icon is animated to transform into said undo delete widget.

Numbered clause 27. An electronic device as claimed in any of clauses 21 to 26, wherein said undo delete widget is anchored to said graphical user interface of said application.

Numbered clause 28. An electronic device as claimed in any preceding clause, wherein an operational shortcut can be performed in relation to one or more selected content items by the user performing a drag from said one or more selected content items onto said shortcut icon.

Numbered clause 29. An electronic device as claimed in clause 28, wherein during said drag the user interface of said application scrolls and/or pans in accordance with said drag.

Numbered clause 30. An electronic device as claimed in any preceding clause, wherein the sidebar is provided as an overlay on the user interface of said application.

Numbered clause 31. An electronic device as claimed in clause 30, wherein at least part of the sidebar is at least partially transparent.

Numbered clause 32. An electronic device as claimed in any preceding clause, wherein the act of displaying the sidebar includes the sidebar being animated to appear on the display.

Numbered clause 33. An electronic device as claimed in any preceding clause, wherein the memory further comprises instructions to:

in response to receipt of a user input indicating a sidebar expansion operation, cause the sidebar to be displayed in an extracted state having an increased width and containing enlarged operational shortcut icons in place of respective operational shortcut icons.

Numbered clause 34. An electronic device as claimed in clause 33, wherein when the sidebar is displayed in an extracted state the appearance of the graphical user interface of the application is adjusted such that at least part of the or each content item is visible in an area unobscured by the sidebar.

Numbered clause 35. An electronic device as claimed in clause 34, wherein when the selected content items are larger than the remaining visible area of the graphical user interface, the selected content is aligned to the side of the remaining visible area opposite the sidebar.

Numbered clause 36. An electronic device as claimed in clause 34 or 35, wherein when the selected content items are smaller than the remaining visible area of the graphical user interface, the selected content is aligned to the centre in the remaining visible area.

Numbered clause 37. An electronic device as claimed in clause 34, 35 or 36, wherein when the selected content items are aligned near an edge of the graphical user interface adjacent the sidebar, the alignment is retained.

Numbered clause 38. An electronic device as claimed in any of clauses 33 to 37, wherein the user input indicating a sidebar expansion operation is a touch on a sidebar expansion icon and/or a swipe from the sidebar away from the edge of the display.

Numbered clause 39. An electronic device as claimed in any of clauses 33 to 37, wherein in said extracted state said sidebar is provided with a header in which at least some metadata associated with the or each content item is displayed.

Numbered clause 40. An electronic device as claimed in any preceding clause, wherein the user is permitted to continue to interact with the graphical user interface of said application in such a way that user input performed in relation to the area of the graphical user interface of said application visible with the sidebar present has the same effect on the application as said input would have had before the sidebar was displayed.

Numbered clause 41. An electronic device as claimed in any preceding clause, wherein the operational shortcut icons displayed in the sidebar are ordered in a prioritised list.

Numbered clause 42. An electronic device as claimed in any preceding clause, wherein the sidebar contains only operational shortcut icons that represent operations capable of being performed by the device on the type of content of the or each selected content item.

Numbered clause 43. An electronic device as claimed in any preceding clause, wherein the sidebar contains operational shortcut icons that represent all the operations capable of being performed by the device on the or each type of content of the selected content item or items.

Numbered clause 44. An electronic device as claimed in any preceding clause, wherein the selection of the operational shortcut icons to be displayed in the sidebar is dependent on the type or types of content of the selected content item or items.

Numbered clause 45. An electronic device as claimed in any preceding clause, wherein the memory further comprises instructions such that, where a selected content item is associated with two or more types of content, said sidebar is displayed at any one time in one of a number of context types each corresponding to a respective one of said types of content associated with said content item and in each of which the sidebar contains only operational shortcut icons that represent operations capable of being performed by the device on the respective type of content, wherein the displayed context type of the sidebar is configured to be changed in response to receipt of a user input indicative of a sidebar context-change operation.

Numbered clause 46. An electronic device as claimed in any preceding clause, further comprising instructions to display in the sidebar one or more fragments representing a portion of another application different from the application currently in focus on the display.

Numbered clause 47. An electronic device as claimed in clause 46, wherein said fragment is displayed responsive to the type of content of said content item.

Numbered clause 48. An electronic device as claimed in clause 46 or 47, wherein said fragment presents information obtained from said another application in said sidebar.

Numbered clause 49. An electronic device as claimed in clause 46, 47 or 48, wherein said fragment provides a user of said device with access to functionality provided by said another application by interacting with the fragment without the user having to navigate away from said current application.

Numbered clause 50. An electronic device as claimed in any of clauses 46 to 49, wherein said fragment is displayed only when said sidebar is displayed in an extracted state having an increased width and containing enlarged operational shortcut icons in place of respective operational shortcut icons.

Numbered clause 51. An electronic device as claimed in clause 50, wherein the sidebar provides a visual indication of the availability of said fragment in said extended state of said sidebar.

Numbered clause 52. An electronic device as claimed in any preceding clause, wherein said instructions that cause the device to display a sidebar on the display are operable to display said sidebar for each of one or more of plural applications in response to receiving said user input performed in relation to one or more selectable content items represented in a graphical user interface of said application.

Numbered clause 53. An electronic device as claimed in any preceding clause, wherein said sidebar is always displayed in the same location on the display.

Numbered clause 54. A computer-implemented method comprising, at an electronic device for providing users of the device with access to content and having a touch-sensitive display for receiving user input, said method comprising:

displaying on the display, in juxtaposition with the graphical user interface of an application, a sidebar representing a shortcut menu, the sidebar containing one or more icons representing operational shortcuts selectable by the user to cause respective operations to be performed in relation to the one or more content items; and in response to detection of a press on an operational shortcut icon, causing the device to display an enlarged operational shortcut icon projecting from the sidebar representing the respective operation in place of the pressed operational shortcut icon.

Numbered clause 55. A method as claimed in clause 54, further comprising, in response to receipt of a user input representing a non-modal shortcut menu-summoning operation performed in relation to one or more selectable content items represented in a graphical user interface of an application displayed on the display:

displaying on the display said sidebar; and permitting the user to continue to interact with at least part of the graphical user interface of said application while the sidebar is displayed on the display.

Numbered clause 56. A computer-implemented method as claimed in clause 55, further comprising, in response to receipt of a user input representing a modal shortcut menu-summoning operation performed in relation to one or more selectable content items represented in a graphical user interface of an application displayed on the display:

displaying said sidebar on said display; and ceasing displaying said sidebar in response to receipt of a user input representing a shortcut menu-dismissing operation, such that the user is thereafter able to continue to interact with the graphical user interface of said application.

Numbered clause 57. A computer-implemented method as claimed in clause 56, wherein the user input representing a modal shortcut menu-summoning operation is a static long press gesture on the content item for a period exceeding a long press threshold time value.

Numbered clause 58. A computer-implemented method as claimed in clause 57, wherein the long press threshold time value is varied dependent on monitored frequency of use of said gesture.

Numbered clause 59. A computer-implemented method as claimed in clause 57 or 58, further comprising, if the user releases the static long press gesture without beforehand dragging on the touch-sensitive display, pinning the sidebar to an edge of a useable area of the display such that it continues to be displayed after the static long press gesture is released.

Numbered clause 60. A computer-implemented method as claimed in clause 57, 58 or 59, wherein, where said user has not yet released said static long press gesture, said user input representing a shortcut menu-dismissing operation is a drag continuing from said static long press and a subsequent release of said drag on an area of the touch-sensitive display off the sidebar.

Numbered clause 61. A computer-implemented method as claimed in any of clauses 57 to 60, wherein, where said user has already released said static long press gesture without beforehand dragging on the touch-sensitive display, said user input representing a shortcut menu-dismissing operation is a tap on an area of the touch-sensitive display off the sidebar.

Numbered clause 62. A computer-implemented method as claimed in any of clauses 55 to 61, wherein said user input representing a non-modal shortcut menu-summoning operation is one or more of:

a static short press gesture on a content item for a period exceeding a short press threshold time value followed by a drag in the direction of the location of the shortcut menu; and a static short press gesture item for a period exceeding a short press threshold time value on a content item followed by a concurrent touch on the display where the shortcut menu will appear.

Numbered clause 63. A computer-implemented method as claimed in clause 62, further comprising ceasing displaying the sidebar if said touch continued from said static short press gesture is released.

Numbered clause 64. A computer-implemented method as claimed in clause 63, wherein said act of ceasing displaying the sidebar is only carried out if no user input representing an interaction with said sidebar is received.

Numbered clause 65. A computer-implemented method as claimed in any of clauses 55 to 64, further comprising ceasing displaying the sidebar as a result of a user selecting an operational shortcut icon in the sidebar.

Numbered clause 66. A computer-implemented method as claimed in any of clauses 55 to 65, wherein said user input representing a non-modal shortcut menu-summoning operation performed in relation to the one or more content items displayed in the graphical user interface of an application also causes a selection of said one or more content items.

Numbered clause 67. A computer-implemented method as claimed in any of clauses 55 to 66 when dependent on clause 57, wherein said user input representing a modal shortcut menu-summoning operation performed in relation to the one or more content items displayed in the graphical user interface of an application also causes a selection of said one or more content items.

Numbered clause 68. A computer-implemented method as claimed in any of clauses 54 to 70, wherein said device is a portable electronic device.

Numbered clause 69. A computer-implemented method as claimed in any of clauses 54 to 68, further comprising, when the graphical user interface of the application displays a list of content items and the device receives user input in the form of a long press on a first content item, displaying in relation to the selected first content item a graphical user interface widget representing a selection handle, the selection handle widget being draggable by a user to select one or more additional content items adjacent the first content item in the list.

Numbered clause 70. A computer-implemented method as claimed in any of clauses 54 to 69, further comprising, in response to receiving user input indicative of a multiple-select operation, allowing a user to select/unselect plural content items presented in the graphical user interface of the application by touching on said content items.

Numbered clause 71. A computer-implemented method as claimed in clause 70, wherein said user input indicative of a multiple-select operation is a touch on a multiple-select operation icon.

Numbered clause 72. A computer-implemented method as claimed in any of clauses 54 to 71, further comprising attempting to perform the respective operations on the selected one or more content items indicated by each operational shortcut icon in response to receipt of user input representing an operational shortcut-activating operation.

Numbered clause 73. A computer-implemented method as claimed in clause 72, wherein said user input representing an operational shortcut-activating operation is a release of a touch on said icon.

Numbered clause 74. A computer-implemented method as claimed in any of clauses 54 to 73, further comprising, in response to receiving user input indicative of a delete operation in relation to a selected content item, displaying a graphical user interface undo delete widget usable by a user of said device to undo a deletion of said content item.

Numbered clause 75. A computer-implemented method as claimed in clause 74, wherein the undo delete widget continues to be displayed until the expiry of a persistence time period which commences once the user starts to interact with the user interface of said application.

Numbered clause 76. A computer-implemented method as claimed in clause 74 or 75, wherein in response to receiving user input indicative of a delete operation in relation to a selected content item the representation of the selected content item in the user interface is altered to indicate its deletion.

Numbered clause 77. A computer-implemented method as claimed in clause 74, 75 or 76, wherein, in response to receiving user input in relation to said undo delete widget, said selected content item thereafter continues to be represented in said graphical user interface and said content item is retained.

Numbered clause 78. A computer-implemented method as claimed in any of clauses 74 to 77, wherein said user input indicative of a delete operation in relation to a selected content item comprises a release of a touch on a delete shortcut icon provided on said sidebar.

Numbered clause 79. A computer-implemented method as claimed in clause 78, wherein, after receiving said user input indicative of a delete operation, said delete shortcut icon is animated to transform into said undo delete widget.

Numbered clause 80. A computer-implemented method as claimed in any of clauses 74 to 79, wherein said undo delete widget is anchored to said graphical user interface of said application.

Numbered clause 81. A computer-implemented method as claimed in any of clauses 54 to 80, wherein an operational shortcut can be performed in relation to one or more selected content items by the user performing a drag from said one or more selected content items onto said shortcut icon.

Numbered clause 82. A computer-implemented method as claimed in clause 81, wherein during said drag the graphical user interface of said application scrolls and/or pans in accordance with said drag.

Numbered clause 83. A computer-implemented method as claimed in any of clauses 54 to 82, wherein the sidebar is provided as an overlay on the user interface of said application.

Numbered clause 84. A computer-implemented method as claimed in clause 83, wherein at least part of the sidebar is at least partially transparent.

Numbered clause 85. A computer-implemented method as claimed in any of clauses 54 to 84, wherein the act of displaying the sidebar includes the sidebar being animated to appear on the display.

Numbered clause 86. A computer-implemented method as claimed in any of clauses 54 to 85, further comprising:
in response to receipt of a user input indicating a sidebar expansion operation, causing the sidebar to be displayed in an extracted state having an increased width and containing enlarged operational shortcut icons in place of respective operational shortcut icons.

Numbered clause 87. A computer-implemented method as claimed in clause 86, wherein when the sidebar is displayed in an extracted state the appearance of the graphical user interface of the application is adjusted such that at least part of the or each content item is visible in an area unobscured by the sidebar.

Numbered clause 88. A computer-implemented method as claimed in clause 87, wherein when the selected content items are larger than the remaining visible area of the graphical user interface, the selected content is aligned to the side of the remaining visible area opposite the sidebar.

Numbered clause 89. A computer-implemented method as claimed in clause 87 or 88, wherein when the selected content items are smaller than the remaining visible area of the graphical user interface, the selected content is aligned to the centre in the remaining visible area.

Numbered clause 90. A computer-implemented method as claimed in clause 87, 88 or 89, wherein when the selected content items are aligned near an edge of the graphical user interface adjacent the sidebar, the alignment is retained.

Numbered clause 91. A computer-implemented method as claimed in any of clauses 87 to 90, wherein the user input indicating a sidebar expansion operation is a touch on a sidebar expansion icon and/or a swipe from the display directed away from the sidebar.

Numbered clause 92. A computer-implemented method as claimed in any of clauses 86 to 91, wherein in said extracted state said sidebar is provided with a header in which at least some metadata associated with the or each content item is displayed.

Numbered clause 93. A computer-implemented method as claimed in any of clauses 54 to 92, wherein the user is permitted to continue to interact with the graphical user interface of said application in such a way that user input performed in relation to the area of the graphical user interface of said application visible with the sidebar present has the same effect on the application as said input would have had before the sidebar was displayed.

Numbered clause 94. A computer-implemented method as claimed in any of clauses 54 to 93, wherein the operational shortcut icons displayed in the sidebar are ordered in a prioritised list.

Numbered clause 95. A computer-implemented method as claimed in any of clauses 54 to 94, wherein the sidebar contains only operational shortcut icons that represent operations capable of being performed by the device on the type of content of the or each selected content item.

Numbered clause 96. A computer-implemented method as claimed in any of clauses 54 to 95, wherein the sidebar contains operational shortcut icons that represent all the operations capable of being performed by the device on the or each type of content of the selected content item or items.

Numbered clause 97. A computer-implemented method as claimed in any of clauses 54 to 96, wherein the selection of the operational shortcut icons to be displayed in the sidebar is dependent on the type or types of content of the selected content item or items.

Numbered clause 98. A computer-implemented method as claimed in any of clauses 54 to 97, further comprising, where a selected content item is associated with two or more types of content, displaying said sidebar at any one time in one of a number of context types each corresponding to a respective one of said types of content associated with said content item and in each of which the sidebar contains only operational shortcut icons that represent operations capable of being performed by the device on the respective type of content, wherein the displayed context type of the sidebar is configured to be changed in response to receipt of a user input indicative of a sidebar context-change operation.

Numbered clause 99. A computer-implemented method as claimed in any of clauses 54 to 98, further comprising displaying in the sidebar one or more fragments representing a portion of another application different from the application currently in focus on the display.

Numbered clause 100. A computer-implemented method as claimed in clause 99, wherein said fragment is displayed responsive to the type of content of said content item.

Numbered clause 101. A computer-implemented method as claimed in clause 99 or 100, wherein said fragment presents information obtained from said another application in said sidebar.

Numbered clause 102. A computer-implemented method as claimed in clause 99, 100 or 101, wherein said fragment provides a user of said device with access to functionality provided by said another application by interacting with the fragment without the user having to navigate away from said current application.

Numbered clause 103. A computer-implemented method as claimed in any of clauses 99 to 102, wherein said fragment is displayed only when said sidebar is displayed in an extracted state having an increased width and containing enlarged operational shortcut icons in place of respective operational shortcut icons.

Numbered clause 104. A computer-implemented method as claimed in clause 103, wherein the sidebar provides a visual indication of the availability of said fragment in said extended state of said sidebar.

Numbered clause 105. A computer-implemented method as claimed in any of clauses 54 to 104, further comprising operating said device to display said sidebar in relation to each of one or more of plural applications in response to receiving said user input performed in relation to one or more selectable content items represented in a graphical user interface of said application.

Numbered clause 106. A computer-implemented method as claimed in any of clauses 54 to 105, wherein said sidebar is always displayed in the same location on the display.

Numbered clause 107. A computer-implemented method as claimed in any of clauses 54 to 106, wherein as a result of a user selecting an operational shortcut icon in the sidebar, the sidebar provides a visual indication that said operational shortcut icon has been selected.

Numbered clause 108. A computer-implemented method as claimed in clause 107, wherein after said selection of said operational shortcut icon in the sidebar, all the components of the sidebar are dismissed, said dismissal being animated.

Numbered clause 109. A computer-implemented method as claimed in clause 108, wherein the animated dismissal of said selected operational shortcut icon is different from the animated dismissal of the other components of the sidebar.

Numbered clause 110. A computer-implemented method as claimed in clause 109, wherein said difference in animated dismissal of said selected operational shortcut and said other components of the sidebar is a delay in commencement of said animation.

Numbered clause 111. A computer-implemented method as claimed in clause 109, wherein said difference in animated dismissal of said selected operational shortcut and said other components of the sidebar is a difference in speed of said animation.

Numbered clause 112. A computer readable medium comprising instructions which when executed by one or more of the processors of an electronic device having a display cause the electronic device to operate in accordance with the method as claimed in any of clauses 54 to 111.

Numbered clause 113. An electronic device as claimed in any of clauses 1 to 53, wherein as a result of a user selecting an operational shortcut icon in the sidebar, the sidebar provides a visual indication that said operational shortcut icon has been selected.

Numbered clause 114. An electronic device as claimed in clause 113, wherein after said selection of said operational shortcut icon in the sidebar, all the components of the sidebar are dismissed, said dismissal being animated.

Numbered clause 115. An electronic device as claimed in clause 114, wherein the animated dismissal of said selected operational shortcut icon is different from the animated dismissal of the other components of the sidebar.

Numbered clause 116. An electronic device as claimed in clause 115, wherein said difference in animated dismissal of said selected operational shortcut and said other components of the sidebar is a delay in commencement of said animation.

Numbered clause 117. An electronic device as claimed in clause 115, wherein said difference in animated dismissal of said selected operational shortcut and said other components of the sidebar is a difference in speed of said animation.

Numbered clause 118. An electronic device comprising:
means for receiving user input;
one or more processors; and
memory comprising instructions which when executed by one or more of the processors cause the electronic device to:
display on the display a menu adjacent an edge of the display, while maintaining at least a portion of a graphical user interface on the display the menu containing one or more icons, each icon representing a menu function selectable by the user;
the memory further comprising instructions that, in response to detection of selection of an icon, cause the device to display a description of the function of the icon.

Numbered clause 119. An electronic device as claimed in clause 118, wherein the memory comprises further instructions that cause the description of the function of the icon to be projected from the menu in response to the detection of selection of an icon.

Numbered clause 120. An electronic device as claimed in clause 118 or 119, wherein said means for receiving user input is a touch sensitive display.

Numbered clause 121. An electronic device as claimed in any of clauses 118 to 120, wherein the memory further comprises instructions to:
in response to receipt of a user input indicating a menu enlarging operation, cause the menu to be displayed in an enlarged state having an increased width and containing enlarged icons in place of respective icons.

What is claimed is:

1. A computer-implemented method of operating an electronic device having a touch-sensitive display for receiving touch input, the method comprising:
display a list of items in a graphical user interface on the touch-sensitive display;
determine that a time duration of a user input representing a selection of an item from the list exceeds a predetermined period of time;
in response to the determination that the time duration exceeds the predetermined period of time, displaying on the touch-sensitive display a menu adjacent an edge of the display, the menu containing one or more icons, each icon representing a function operable in relation to the selected item and being selectable by the user;

in response to continued detection of the user input representing the user selection of the item and detection of a second, concurrent touch in relation to one of the one or more icons, displaying a description of the function of the icon, wherein the description is displayed individually projecting from the menu; and in response to receipt of a menu enlarging touch input, displaying in the menu a description of the function for each of the one or more icons and a graphical user interface element that represents a portion of the function of one of the one or more icons.

2. A method as claimed in claim 1, further comprising, in response to ceasing detection of the touch in relation to the icon of the one or more icons, ceasing display of the description of the function of the icon.

3. A method as claimed in claim 2, wherein ceasing display of the description of the function of the icon comprises retracting the description.

4. A method as claimed in claim 3, wherein the description projecting from the menu comprises the description being displayed as an animation moving out from the menu, and retracting the description comprises the description being displayed as an animation moving in to the menu until the description ceases to be displayed.

5. A method as claimed in claim 2, the method further comprising detecting a touch in relation to another of the one or more icons and displaying a description of the function of the other icon.

6. A method as claimed in claim 1, wherein the menu enlarging touch input comprises at least one of a touch on a menu expansion icon and a swipe gesture on the display directed away from the menu.

7. A method as claimed in claim 1, further comprising displaying the menu on the display while maintaining at least a portion of the graphical user interface on the display.

8. A method as claimed in claim 7, wherein selection of the icon of the one or more icons causes the function to be carried out on the item.

9. A method as claimed in claim 8, wherein the touch in relation to the icon comprises a release of a press on the icon, on the description of the function of the icon, or both.

10. A method as claimed in claim 8, wherein, in response to receipt of the menu enlarging touch input, displaying the menu with a header in which metadata associated with the item is displayed.

11. A method as claimed in claim 1, wherein the menu is provided as an overlay on the graphical user interface.

12. A method as claimed in claim 1, wherein the menu is provided in a sidebar.

13. A method as claimed in claim 1, wherein the description of the function of each of the one or more icons is displayed projecting away from an edge of the display.

14. A method as claimed in claim 1, further comprising displaying the graphical user interface element in the menu in at least an enlarged state of the menu.

15. A method as claimed in claim 14, wherein when the menu is not displayed in the enlarged state, the menu provides a visual indication of the availability of the graphical user interface element in the enlarged state of the menu.

16. A method as claimed in claim 1, wherein the graphical user interface element is displayed in response to the user selection of the one of the one or more icons of the menu while maintaining at least a portion of the graphical user interface on the display while the menu is displayed.

17. A method as claimed in claim 1, wherein the graphical user interface element displays information obtained from a second item of the graphical user interface.

18. A method as claimed in claim 17, wherein the graphical user interface element provides the user of the device with access to functionality of the second item without the user having to navigate from the user selected item.

19. A method as claimed in claim 1, wherein after selection of the icon of the one or more icons in the menu, all of the one or more icons of the menu are dismissed, the dismissal being animated.

20. A method as claimed in claim 19, wherein the animated dismissal of the selected icon, the description of the selected icon, or both is different from the animated dismissal of the other of the one or more icons of the menu.

21. A method as claimed in claim 20, wherein the animated dismissal of the selected icon, the description of the selected icon, or both is delayed relative to the animated dismissal of the other of the one or more icons of the menu.

22. A method as claimed in claim 20, wherein a speed dismissal of the selected icon, the description of the selected icon, or both is different relative to a speed of dismissal of the other of the one or more icons of the menu.

23. An electronic device comprising:
a touch-sensitive display;
one or more processors; and
memory comprising instructions which when executed by one or more of the processors cause the electronic device to:
display a list of items in a graphical user interface on the touch-sensitive display;
determine that a time duration of a user input representing a selection of an item from the list exceeds a predetermined period of time;
in response to the determination that the time duration exceeds the predetermined period of time, display on the touch-sensitive display a menu adjacent an edge of the display, the menu containing one or more icons, each icon representing a function operable in relation to the selected item and being selectable by the user;
in response to continued detection of the user input representing the user selection of the item and detection of a second, concurrent touch in relation to one of the one or more icons, displaying a description of the function of the icon, wherein the description is displayed individually projecting from the menu; and
in response to receipt of a menu enlarging touch input, displaying in the menu a description of the function of each of the one or more icons and a graphical user interface element that represents a portion of the function of one of the one or more icons.

24. An electronic device as claimed in claim 23, wherein the memory comprises further instructions to, in response to ceasing detection of the touch in relation to the icon of the one or more icons, ceasing display of the description of the function of the icon.

25. A non-transitory computer readable medium comprising instructions which when executed by one or more of the processors of an electronic device having a touch-sensitive display cause the electronic device to:
display a list of items in a graphical user interface on the touch-sensitive display;
determine that a time duration of a user input representing a selection of an item from the list exceeds a predetermined period of time;
in response to the determination that the time duration exceeds the predetermined period of time, display on the touch-sensitive display a menu adjacent an edge of the display, the menu containing one or more icons, each icon representing a function operable in relation to the selected item and being selectable by the user;

in response to continued detection of the user input representing the selection of the item and detection of a second, concurrent touch input in relation to one of the one or more icons, display cause the device to display a description of the function of the icon, wherein the description is displayed individually projecting from the menu; and in response to receipt of a menu enlarging touch input, display in the menu a description of the function for each of the one or more icons and a graphical user interface element that represents a portion of the function of one of the one or more icons.

* * * * *